US008839278B2

(12) United States Patent
Wang et al.

(10) Patent No.: US 8,839,278 B2
(45) Date of Patent: Sep. 16, 2014

(54) MODELING USER ACTIVITY INFORMATION ASSOCIATED WITH A NETWORK SYSTEM

(75) Inventors: Jia Wang, Randolph, NJ (US); Zihui Ge, Florham Park, NJ (US); Seungjoon Lee, Springfield, NJ (US); Tongqing Qiu, Smyrna, GA (US); Jun Xu, Atlanta, GA (US); Qi Zhao, Short Hills, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 584 days.

(21) Appl. No.: 12/797,176

(22) Filed: Jun. 9, 2010

(65) Prior Publication Data

US 2011/0307913 A1   Dec. 15, 2011

(51) Int. Cl.
*H04H 60/33*  (2008.01)
*H04H 60/32*  (2008.01)
*G06F 3/00*  (2006.01)
*H04N 7/173*  (2011.01)

(52) U.S. Cl.
USPC ....... 725/9; 725/13; 725/16; 725/46; 725/105

(58) Field of Classification Search
USPC ................................... 725/9, 13, 16, 46, 105
See application file for complete search history.

(56) References Cited

U.S. PATENT DOCUMENTS

| | | | | |
|---|---|---|---|---|
| 7,284,256 | B2 * | 10/2007 | Candelore et al. | 725/46 |
| 2002/0069403 | A1 * | 6/2002 | Itoh et al. | 725/9 |
| 2002/0129368 | A1 * | 9/2002 | Schlack et al. | 725/46 |
| 2003/0101449 | A1 * | 5/2003 | Bentolila et al. | 725/10 |
| 2007/0061831 | A1 * | 3/2007 | Savoor et al. | 725/13 |
| 2010/0179987 | A1 * | 7/2010 | Sebastian et al. | 709/203 |
| 2010/0269134 | A1 * | 10/2010 | Storan et al. | 725/34 |

OTHER PUBLICATIONS

The Nielsen Company. <http://www.nielsenmedia.org>, 1 page, printed Jun. 21, 2010.
Dakshi Agrawal, Mandis S. Beigi, Chatschik Bisdikian, and Kang-Won Lee. Planning and Managing the IPTV Service Deployment. In 10th IFIP/IEEE International Symposium on Integrated Network Management, pp. 353-362, 2007.
Paul Barford and Mark Crovella. Generating representative web workloads for network and server performance evaluation. In SIGMETRICS, pp. 151-160, 1998.
Kathryn Jo-Anne Barger. Mixtures of exponential distributions to describe the distribution of poisson means in estimating the number of unobserved classes. Master's thesis, Cornell University, 97 pages, 2006.
Meeyoung Cha, Haewoon Kwak, Pablo Rodriguez, Yong-Yeol Ahn, and Sue Moon. I Tube, You Tube, Everybody Tubes: Analyzing the World's Largest User Generated Content Video System. In Proceedings of ACM IMC, 13 pages, 2007.

(Continued)

*Primary Examiner* — Gigi L Dubasky
(74) *Attorney, Agent, or Firm* — Toler Law Group, PC

(57) ABSTRACT

Systems and methods to model user activity information associated with a network system are provided. A particular method includes receiving, at a computing device, a request for user activity information associated with selected channels of a television access network that provides multimedia content to users. The method includes executing a model of user activity associated with the television access network at the computing device. The model estimates the user activity information as user multimedia access demands during particular time periods within a day. The method also includes storing the user activity information at a computer-readable non-transitory storage medium.

18 Claims, 24 Drawing Sheets

(56) References Cited

OTHER PUBLICATIONS

Meeyoung Cha, Pablo Rodriguez, Jon Crowcroft, Sue Moon, and Xavier Amatrianin. Watching Television Over an IP Network. In Proceedings of ACM IMC, 13 pages, 2008.

Ludmila Cherkasova and Minaxi Gupta. Characterizing locality, evolution, and life span of accesses in enterprise media server workloads. In NOSSDAV, 10 pages, 2002.

Maureen Chesire, Alex Wolman, Geoggrey M. Voelker, and Henry M. Levy. Measurement and analysis of a streaming media workload. In USITS, pp. 1-12, 2001.

Cristiano P. Costa, Italo S. Cunha, Alex Borges Vieira, Claudiney Vander Ramos, Marcus M. Rocha, Jussara M. Almeida, and Berthier A. Riberio-Neto. Analyzing client interactivity in streaming media. In WWW, pp. 534-543, 2004.

Lei Guo, Enhua Tan, Songqing Chen, Zhen Xiao, and Xiaodong Zhang. The stretched exponential distribution of internet media access patterns. In PODC, pp. 283-294, 2008.

Harrison and Brian Amento. CollaboraTV: Using Asynchronous Communication to Make TV Social Again. In EuroITV, 5 pages, 2007.

Xiaojun Hei, Chao Liang, Yong Liu, and Keith W. Ross. A measurement study of a large-scale p2p IPTV system. IEEE Transactions on Multimedia, 9(8):1672-1687, 2007.

Nicholas P. Jewell. Mixtures of Exponential Distributions. In Annuals of Statistics, 6 pages, 1982.

Xiaofei Liao, Hai Jin, Yunhao Liu, Lionel M. Ni, and Dafu Deng. Anysee: Peer-to-peer live streaming. In INFOCOM, 7 pages, 2006.

Tongqing Qiu, Zihui Ge, Seungjoon Lee, Jia Wang, Qi Zhao, and Jun (Jim) Xu. Modeling Channel Popularity Dynamics in a Large IPTV System. In SIGMETRICS, 12 pages, 2009.

Thomas Silverston, Olivier Fourmaux, Kav'e Salamatian, and Kenjiro Cho. Measuring P2P IPTV Traffic on Both Sides of the World. In CoNEXT, 2 pages, 2007.

Donald E. Smith. IPTV Bandwidth Demand: Multicast and Channel Surfing. In INFOCOM, pp. 2546-2550, 2007.

Wenting Tang, Yun Fu, Ludmila Cherkasova, and Amin Vahdat.. Medisyn: a synthetic streaming media service workload generator. In NOSSDAV '03, pp. 12-21, 2003.

J. Weber and J. Gong. Modeling switched video broadcast services. In CableLabs, pp. 12-14, 2003.

Young J. Won, Mi-Jung Choi, Byung-Chul Park, Hee-Won Lee, Chan-Kyu Hwang, and Jae-Hyoung Yoo. End-user iptv traffic measurement of residential broadband access networks. In NOMS Workshops 2008, 2008.

Hongliang Yu, Dongdong Zheng, Ben Y, Zhao, and Weimin Zheng. Understanding user behavior in large-scale video-on-demand systems. In EuroSys, pp. 333-344, 2006.

Xinyan Zhang, Jiangchuan Liu, Bo Li, and Tak-Shing Peter Yum. Coolstreaming/donet: a data-driven overlay network for peer-to-peer live media streaming. In INFOCOM, pp. 2102-2111, 2005.

Barford and M. Crovella. Generating representative web workloads for network and server performance evaluation. In SIGMETRICS, pp. 151-160, 1998.

J. Bradley. Distribution-free statistical tests. Prentice-Hall., 1968.

L. Cherkasova and M. Gupta. Characterizing locality, evolution, and life span of accesses in enterprise media server workloads. In NOSSDAV, 10 pages, 2002.

M. Chesire, A. Wolman, G. M. Voelker, and H. M. Levy. Measurement and analysis of a streaming media workload. In USITS, pp. 1-12, 2001.

J. Chu, K. Labonte, and B. Levine. Availability and locality measurements of peer-to-peer file systems. In Proceedings of ITCom: Scalability and Traffic Control in IP Networks, 12 pages, 2002.

C. P. Costa, I. S. Cunha, A. B. Vieira, C. V. Ramos, M. M. Rocha, J. M. Almeida, and B. A. Ribeiro-Neto. Analyzing client interactivity in streaming media. In WWW, 10 pages, 2004.

J. L. Doob. The Brownian movement and stochastic equations. Annals of Math, 40(1):351-369, 1942.

L. Guo, E. Tan, S. Chen, Z. Xiao, and X. Zhang. The stretched exponential distribution of internet media access patterns. In PODC, pp. 283-294, 12 pages, 2008.

Y. Huang, T. Z. J. Fu, D.-M. Chiu, J. C. S. Lui, and C. Huang. Challenges, Design and Analysis of a Large-scale P2P-VoD System. In Proc. ACM SIGCOMM, 14 pages, 2008.

J. B. MacQueen. Some methods for classification and analysis of multivariate observations. In Proceedings of 5-th Berkeley Symposium on Mathematical Statistics and Probability, pp. 281-297, 1967.

J.Nielsen.Zipf curves and web site popularity, www.useit.com/alertbox/zipf.html, 3 pages, 1997.

G.Uhlenbeckrandl. Ornstein. On the Theory of Brownian Motion. Physical Review, 19 pages, Sep. 1930.

Y. Yang. Expert network: effective and efficient learning from human decisions in text categorization and retrieval. In SIGIR 94, pp. 13-22, New York, NY, USA, 1994. Springer-Verlag New York, Inc.

H. Yu, D. Zheng, B. Y. Zhao, and W.Zheng.Understanding user behavior in large-scale video-on-demand systems. SIGOPS Oper. Syst. Rev., 40(4):333-344, 2006.

* cited by examiner

MODELING USER ACTIVITY INFORMATION ASSOCIATED WITH A NETWORK SYSTEM

FIELD OF THE DISCLOSURE

The present disclosure is generally related to modeling user activity information associated with network systems to facilitate design of all or portions of network systems and to facilitate continued efficient operation of existing network systems.

BACKGROUND

For some network system, such as television distribution systems (e.g., cable and satellite), data flows from a service provider to users. User activities have little system-wide impact. For other network systems (e.g., Internet Protocol Television (IPTV) systems), data flows bi-directionally to and from the service provider and the users. User activities may have a large system-wide impact. An understanding of user activities and realistic models of user activity are lacking. Previous models for user activities are sometimes quite different from reality and can potentially lead to incorrect estimation of system performance. For example, while a constant-rate Poisson process is widely used as a workload model for some systems, the constant-rate Poisson process may not accurately model bursty activity. An alternative to a user activity model is to directly use actual trace data for the evaluation of system performance. Such data, even when anonymized, may contain too much commercial information and user information to be publicly distributed.

DETAILED DESCRIPTION

In a particular embodiment, a method includes receiving, at a computing device, a request for user activity information associated with selected channels of a television access network that provides multimedia content to users. The method includes executing a model of user activity associated with the television access network at the computing device. The model estimates the user activity information as user multimedia access demands during particular time periods within a day. The method also includes storing the user activity information at a computer-readable non-transitory storage medium.

In a particular embodiment, a system comprises a processor and a non-transitory memory. The non-transitory memory comprises instructions executable by the processor to determine, based on a model that takes into consideration diurnal patterns of user activity, estimated user activity information associated with channels of a multimedia content delivery system for a particular time frame. The non-transitory memory comprises instructions executable by the processor to modify at least one parameter of the multimedia content delivery system based on the estimated user activity information.

In a particular embodiment, a computer-readable storage medium includes instructions, executable by a processor to estimate unicast traffic demand and multicast traffic demand of a network based on a model that takes into consideration diurnal patterns of user activity. The computer-readable storage medium also includes instructions executable by the processor to store the estimated unicast traffic demand and the estimated multicast traffic demand to a computer-readable non-transitory storage medium. The estimated unicast traffic demand and the estimated multicast traffic demand are used to determine at least one parameter for the network.

Figure 1:
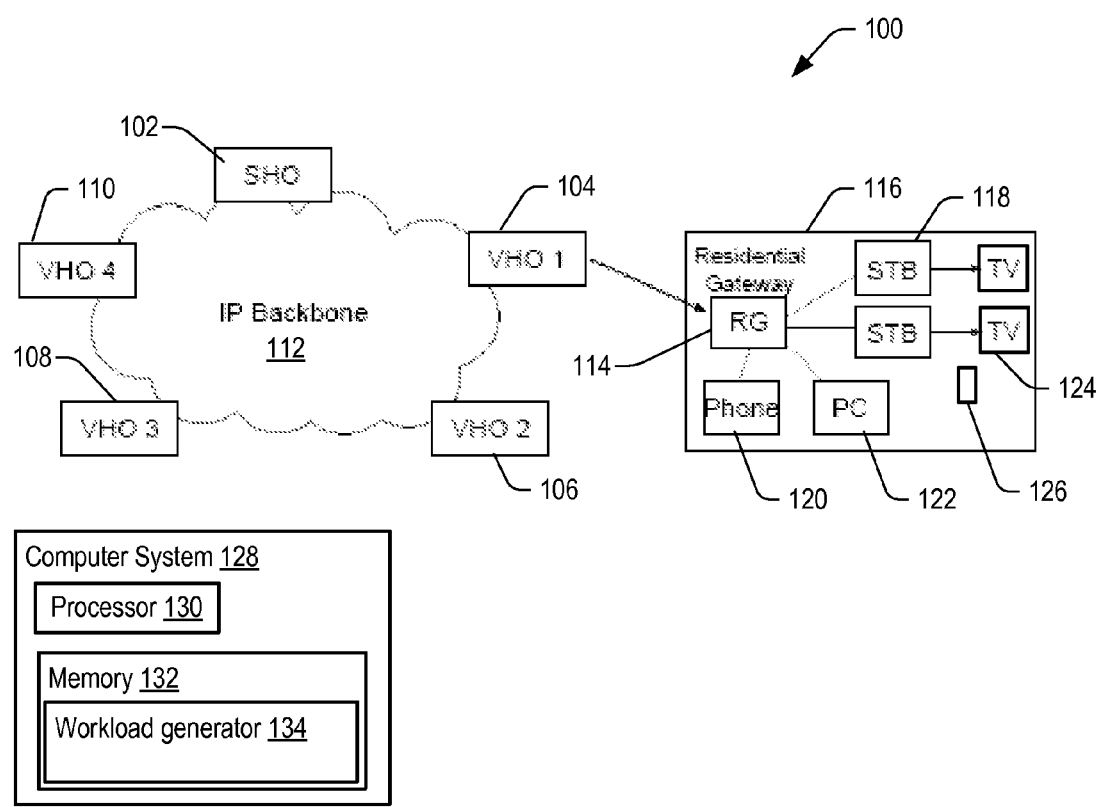
FIG. 1 is a block diagram of a particular embodiment of a network system including a computer system for modeling user activity information associated with the network system.

FIG. 1 shows an embodiment of a schematic representation of a network system 100. The network system 100 may be an Internet Protocol television (IPTV) system. A super hub office (SHO) 102 digitally encodes video streams received from a content source. The content source may include one or more satellites or other content providers. The SHO 102 transmits the encoded video streams to multiple video hub offices (VHOs) 104-110 through a high-speed IP backbone network 112. Each VHO 104-110 may be responsible for a service area (e.g., a metropolitan area). The VHOs 104-110 may acquire additional local content (e.g., local news), perform further processing (e.g., advertisement insertion), and transmit the processed video streams to end users upon request from customer premises equipment associated with the users. The customer premises equipment may be located at a customer residence, a business location, or other location. The customer premises equipment may include, but is not limited to, residential gateways, modems, routers, and set-top box devices. The customer premises equipment may send received multimedia content to one or more user devices.

FIG. 1 depicts a VHO 104 sending multimedia content to a residential gateway (RG) 114 at a residence 116. The RG 114 may receive multimedia content and data from the VHO 104. The RG 114 may forward the multimedia content and data to set-top box (STB) devices 118 and user devices 120, 122 that requested the multimedia content and data. The STB devices 118 may send received multimedia media content to televisions 124 or other user devices coupled to the STB devices 118. The user devices 120, 122 may be phones, mobile phones, computing devices, lap top computers, game consoles, or other types of devices. Additional or fewer user devices may be coupled to the RG 114. Also, additional types of user devices may be coupled to the RG 114.

The RG 114 of FIG. 1 may receive data from the STB devices 118 and the user devices 120, 122. The data may be forwarded to the VHO 104 or other destinations. FIG. 1 depicts the VHO 104 sending multimedia content to a single residence 116 having particular customer premises equipment and user devices. Each of the VHOs 104-110 may send multimedia content to and receive data from many (e.g., hundreds or thousands) residences and business locations, which may have many different types of customer premises equipment and user devices.

A user of the IPTV system 100 may have one or more input devices 126 for the STB devices 118 and the user devices 120, 122. The input devices 126 may be, but are not limited to, remote control devices, keyboards, computer input devices (e.g., a computer mouse), and touch screens, and other devices. A user at the residence 116 may receive media content on channels from the VHO 104. Remote control devices may be used to input commands and requests to the STB devices 118. The remote control devices may allow the user to select particular channels to watch. The user may change channels by using up-down buttons to sequentially switch channels, may use a return button to jump back to a previously watched channel, or may enter a channel number to jump directly to a channel corresponding to the number. The network system 100 may also support additional features for the remote control devices. For example, the network system 100 may add the capability for a number of user-defined favorite channels, so that a user can easily switch between or scan through the favorite channels. Also, the STB devices 118 may support a digital video recording (DVR) feature. With the help of a local hard drive, a user can pause, rewind, fast forward (up to the current live play position), and record television programs being played. The network system 100 may support one or more channels being recorded to DVR while another channel is played live on the television. Also, the network system 100 may support features such as Picture-In-Picture (PIP), on-line gaming and chatting, and personalized web services on the television 124, each of which may be accessed using the input device 126 (e.g., remote control device).

Video content of a channel sent to the residence 116 may be delivered using internet protocol (IP) multicast to leverage the one-to-many nature of IPTV traffic and ease the bandwidth requirement of the VHOs 104-110. Depending on a channel and a codec used, a bit rate of a video stream may vary from around 1.5 Mbps (e.g., for standard definition television using a H.264 codec) to around 15 Mbps (e.g., for high definition television using a MPEG2 codec). A user may experience some delay when changing a channel. Latency of a channel switch may be due to multicast group management and video decoding dependency (e.g., waiting for a buffer for the video to be populated). The latency may be as long as a few seconds when no process to reduce the latency is implemented. The latency may motivate some users to perform more targeted channel switches than random or sequential channel scans compared to users from conventional television systems. The network system 100 may adopted a fast-channel-switch mechanism to address the latency issue. The fast-channel-switch mechanism uses servers in the VHOs 104-110 to send a set-top box device requesting a channel change a unicast video stream to quickly populate a buffer of the set-top box and to enable requested content to be shown on an end user device (e.g., the user devices 120, 122 or the televisions 124) more quickly. When a multicast video stream of the video content catches up with the unicast video stream, or after a certain amount of time, the unicast stream may be stopped.

The IPTV system 100 may be coupled to a computer system 128. The computer system 128 may include one or more processors 130 and a non-transitory memory 132. The computer system 128 may be used to model the network system 100 or portions of the network system 100. The non-transitory memory 132 may include a workload generator 134 that models user activity for the network system 100. Results of the workload generator 134 may be stored in the non-transitory memory 132 or at a different location. The workload generator 134 may be used during design of the network system 100 or during design of now or modified portions of the network system 100 (municipal systems that that are to be installed or are being installed). The workload generator 134 may be used to model existing network systems 100 and portions thereof to evaluate the performance of the systems.

The computer system 128 may be used to provide parameters to the network system 100 based on modeling results of the workload generator 134. The parameters may be related to particular equipment of the IPTV system 100. The computer system 128 may be coupled to the IPTV system 100 so that the computer system 128 is able to modify existing parameters used by the IPTV system 100 to the parameters based on the modeling results of the IPTV system 100. Some parameters may be determined by the computer system 128 without human input. Human intervention may be used to choose particular parameters from available choices based on modeling results.

Figure 2:
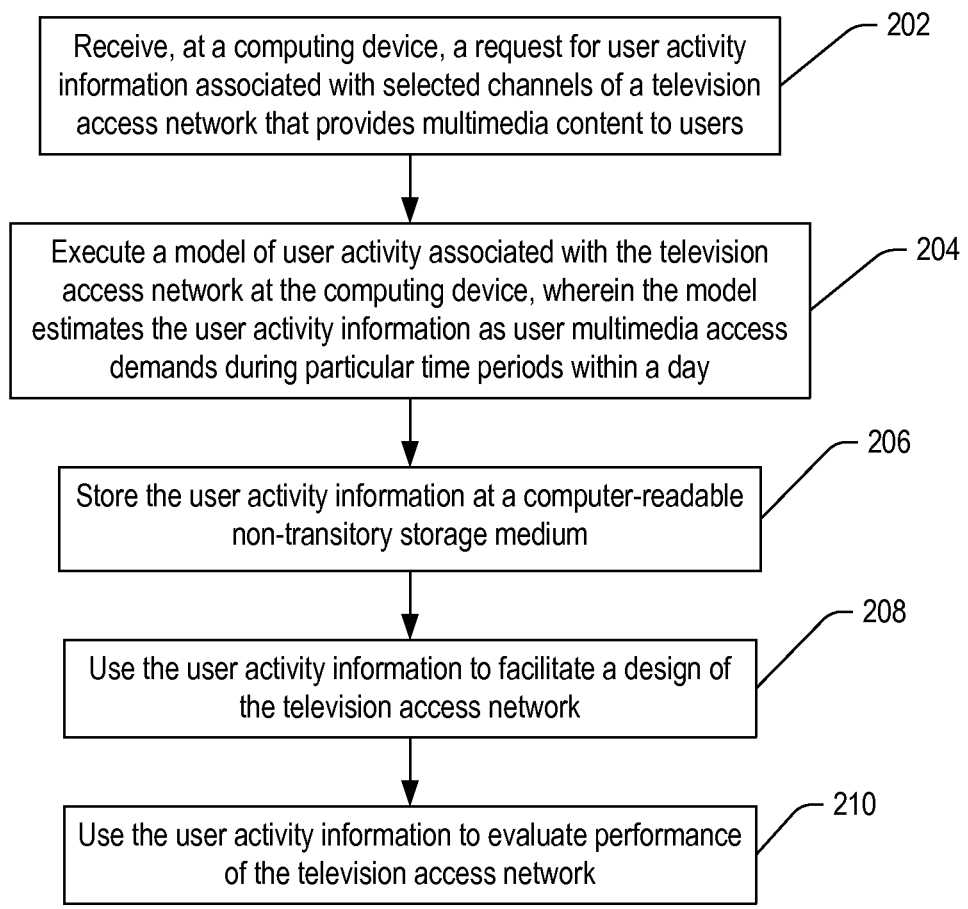
FIG. 2 is a flow chart of a first particular embodiment of a method of modeling user activity information associated with a network system.

Referring to FIG. 2, a flow chart of a first particular embodiment of a method of modeling user activity information associated with a network system is shown. The network system of the method of FIG. 2 may be the IPTV network 100 of FIG. 1. The method includes receiving, at a computing device, a request for user activity information associated with selected channels of a television access network that provides multimedia content to users, at 202. For example, the computer system 128 of FIG. 1 may receive a request for user activity information.

At 204, a model of user activity associated with the television access network may be executed at the computing device. The model estimates the user activity information as user multimedia access demands during particular time periods within a day. The user multimedia access demands may include or be related to user actions at set-top box devices.

At 206, the user activity information is stored at a computer-readable non-transitory storage medium. The user activity information may include, but is not limited to, channel popularity dynamics, channel popularity distribution, a number of set-top box devices that are on-line as a function of time in a day, session-length distribution, aggregate event rate, other information, and combinations thereof.

The user activity information may be used to facilitate design of the television access network, at 208. The design may include developing a new television access network before installation of the television access network, adding equipment to an existing television access network, adding new features to the existing television access network, or combinations thereof.

The user activity information may be requested to evaluate performance of the television access network after the television access network is implemented, at 210. The user activity information may be used to determine one or more operating parameters of the implemented television access network. The one or more determined operating parameters may be introduced in the television access network by storing the parameters at appropriate locations so that equipment of the television access network can access and use the one or more determined parameters.

Figure 3:
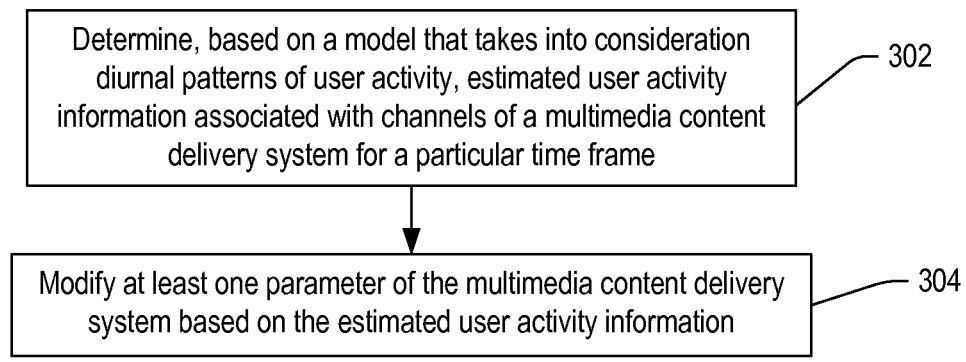
FIG. 3 is a flow chart of a second particular embodiment of a method of modeling user activity information associated with a network system.

Referring to FIG. 3, a flow chart of a second particular embodiment of a method of modeling user activity information associated with a multimedia content delivery system is shown. The multimedia content delivery system of the method of FIG. 3 may be the IPTV network 100 of FIG. 1.

The method includes determining, based on a model that takes into consideration diurnal patterns of user activity, estimated user activity information associated with channels of a multimedia content delivery system for a particular time frame, at 302. The multimedia content delivery system may be an IPTV system, a peer-to-peer network, or other multimedia system where user activity influences system performance.

In a particular embodiment, the model divides a plurality of network devices that receive multimedia content from the multimedia content delivery network into a plurality of device classes based on at least one grouping attribute. The grouping attribute may be a threshold based grouping. The threshold based grouping may be, but is not limited to, daily watching time, time of day watching pattern, daily channel change count, median dwell time on channels, location, other factors, or combinations thereof. The grouping attribute may be a clustering algorithm based grouping. The clustering algorithm based grouping may be, but is not limited to, hourly television watching time, hourly channel changes, hourly dwell time, hourly median dwell time, channel preferences, other factors, or combinations thereof.

The method also includes modifying at least one parameter of the multimedia content delivery system based on the estimated user activity information, at 304. The at least one parameter may be determined by a computer system that runs the model, by an operator who analyzes results of the model, or by both.

Figure 4:
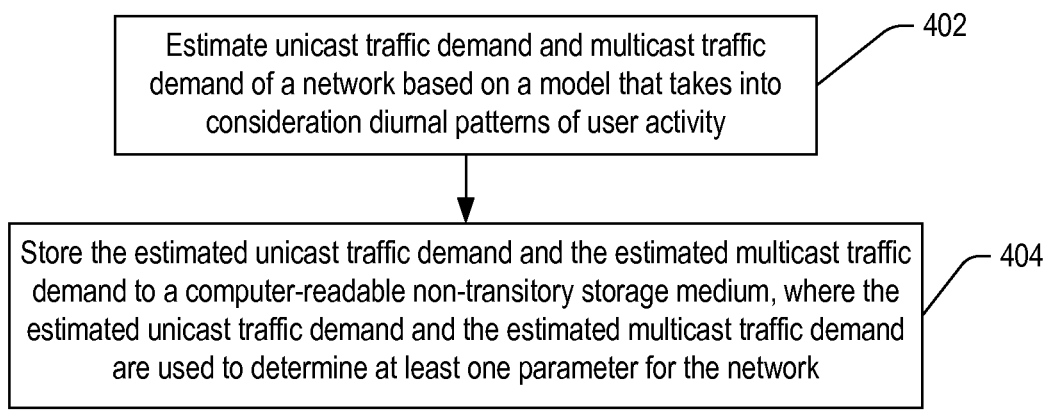
FIG. 4 is a flow chart of a third particular embodiment of a method of modeling user activity information associated with a network system.

Referring to FIG. 4, a flow chart of a third particular embodiment of a method of modeling user activity information associated with a network is shown. The network of the method of FIG. 4 may be the network system 100 of FIG. 1.

The method includes estimating unicast traffic demand and multicast traffic demand of a network based on a model that takes into consideration diurnal patterns of user activity, at 302. The model may simulate channel sessions of time between switching-on events and switching-off events of customer premises equipment (e.g., STB devices 118 of FIG. 1). The estimated unicast traffic and the estimated multicast traffic may be for a particular device in the network (e.g., a server, router, a digital subscriber line access multiplexer (DSLAM), switch, or other network device of the network system 100 of FIG. 1).

The method also includes storing the estimated unicast traffic demand and the estimated multicast traffic demand to a computer-readable non-transitory storage medium, at 404. The estimated unicast traffic demand and the estimated multicast traffic demand are used to determine at least one parameter for the network. The at least one parameter for the network may be stored in a memory accessible to the particular device. The particular device may access the at least one parameter and use the at least one parameter during provision of multimedia content to users.

The models used in the methods depicted in FIGS. 2-4 may use a limited number of parameters derived from user activity data. Descriptions of the data set, derivation of models for estimating user activity information, processes for determining parameters of the models, and applications of the models are described below.

In a particular embodiment, a first data set was used to develop parameters for a model of user activity information. The first data set was collected from a large scale IPTV provider in the United States with over one million subscribers and over two million set-top box devices spread throughout four different time zones. No information that could be used to directly or indirectly identify individual subscribers was included. By combining data from anonymous set-top box device logs, control plane messages, network configuration data, and television channel lists obtained from the service provider, user activities such as turning on/off set-top box devices, switching channels, and playing live or recorded television program were modeled. In particular, each activity recorded in a set-top box device log was associated with an identifier of an origin set-top box device and a timestamp. The timestamp had a precision of one second. Set-top box devices were mapped to their metropolitan area and the associated timestamps were converted into their local time to accommodate different time zones.

Data was analyzed and validated data from multiple periods of time. For simplicity, analysis and results presented herein are for the first data set, which was obtained for a six day period from Apr. 2, 2009 to Apr. 7, 2009. Data from Apr. 8, 2009 was used to validate user activity information generated by the model resulting from the analysis of the data.

The first data set had certain limitations. For example, a timestamp of a channel switch event indicated the time that a request was received at a set-top box device. The time that the request was received at the set-top box device may be different than a time the request was received at a video head end, and may be different than a time when streaming content corresponding to the request was received at the set-top box device. Requests that are very rapidly followed by a subsequent request (e.g., during fast sequential channel changing) may not have been recorded by the set-top box device, and were not considered.

The data of the first data set was derived from set-top box devices not from remote control devices. Thus, only the outcome of a user action can be determined, not the action that initiated the outcome. For example, a channel switching event may be initiated by using the up/down button on a remote controller, by using the favorite channels button on the remote controller, or by manually entering a number using the remote controller. The set-top box devices used to gather the first data set only record the channel switching event. Inference may be used to estimate which method was used to instigate the channel switching event.

Also, detailed television program information was not available when a DVR is used. The set-top box device logs indicate when a recorded video was played, but not what content was played. A special channel designation of 9999 was used to indicate a user tuning into the DVR mode and playing something that was previously recorded. Also, data regarding advanced features (e.g., online gaming) was incomplete. Therefore, such advanced features were ignored.

To develop a model that mimics user activities to produce realistic event series for tasks such as system performance evaluation, an understanding of how users act in an operational IPTV system may be needed. An understanding of how users act may be obtained by focusing on aggregate properties shown by the data. The aggregate properties may include turning set-top box devices on and off, channel switching events, and channel popularity.

Figure 5:
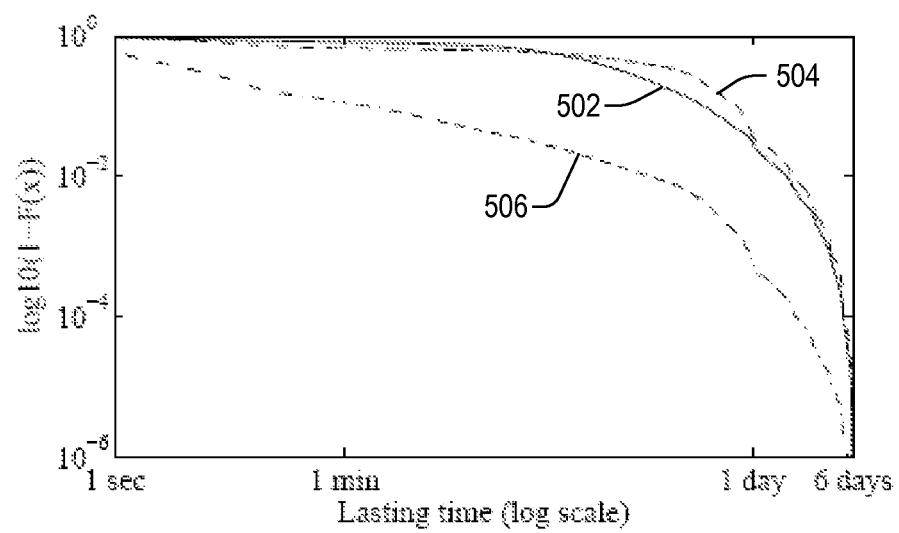
FIG. 5 is a graph of complementary cumulative distribution function (CCDF) of the length of on-sessions, off-sessions, and channel sessions.

For purposes of this description, an "on-session" for a set-top box device is a duration from when the set-top box device is switched on until the set-top box device is turned off. Similarly, an "off-session" for the set-top box device is a duration from when the set-top box device is turned off until the set-top box device is turned on. FIG. 5 shows complementary cumulative distribution function (CCDF) of the length of on-sessions and off-sessions for the first set of data. On-session curve 502 shows the data for on-sessions and off-session curve 504 shows the data for off-sessions. Both on-session curve 502 and off-session curve 504 exhibit a very long tail in their distributions. Around 5% of the on-sessions and off-sessions are over 1 day in length. Fast drops in both tails approaching the right end of the x-axis may be due to the six day time limit of the first data set. The off-sessions curve 504 has a heavier tail than the on-sessions curve 502. This may indicate that users are more likely to leave televisions off for a long time (e.g., several days) than to leave televisions on for a long time. For low session length, the off-session curve 504 is below the on-session curve 502. A reason for this may be that a user who accidentally turns off the set-top box device may quickly switch the set-top box device back on, producing a short off-session, which may be more common than quickly ending an on-session.

Figure 6:
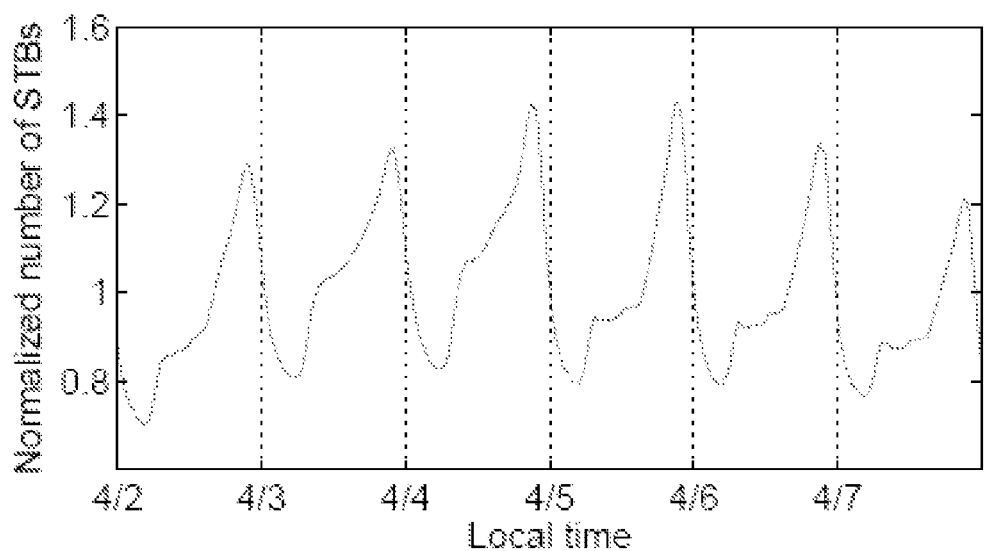
FIG. 6 is a graph showing the number of on-line set-top box devices as a function of time.

FIG. 6 depicts a time series of a number of on-line set-top box devices normalized by an average number of on-line set-top box devices. FIG. 6 shows a diurnal pattern with a daily peak at around 9 pm, followed by a quick decrease in number reaching a daily minimum at around 4 am, and then steadily ramping up during the course of day. FIG. 6 also shows that a significant number of set-top box devices are left on overnight.

Figure 7:
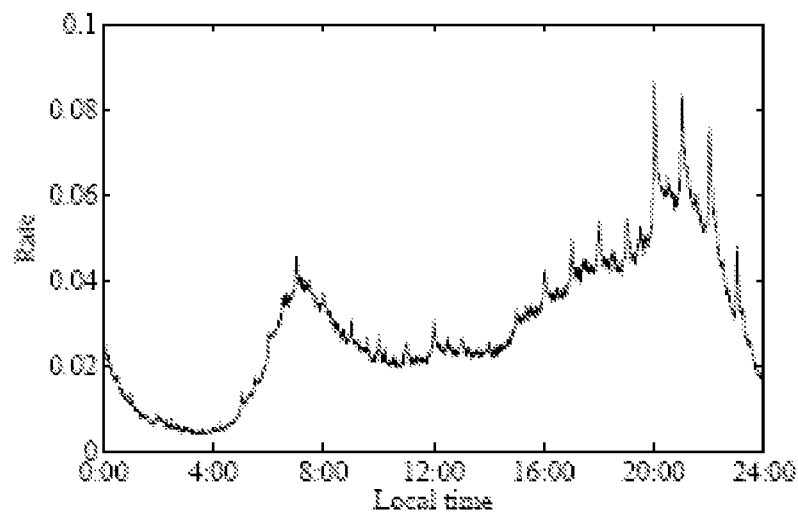
FIG. 7 is a graph of rate versus local time for switching-on events.
Figure 8:
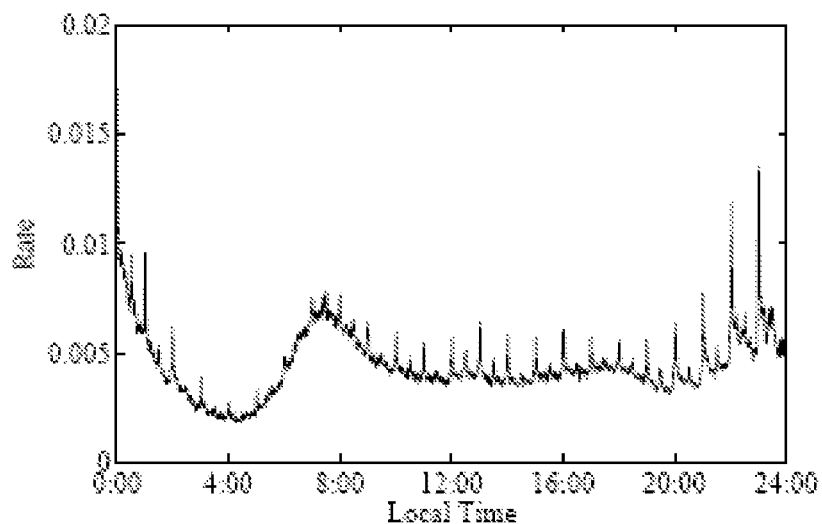
FIG. 8 is a graph of rate versus local time for switching-off events

On-sessions and off-sessions are bounded by users switching on and off the set-top box devices. FIG. 7 depicts a one-day time series of event rate for switching-on set-top box devices. FIG. 8 depicts a one-day time series of event rate for switching-off set-top box devices. The event rate is the number of switching-on/switching-off events during the interval normalized by the total number of off-line/on-line set-top box devices at the beginning of the interval. FIG. 7 and FIG. 8 each show a time of day effect. The switching-on event rate peaks at around 7 am and around 9 pm. The switching-off event rate has local peaks at around 7:30 am and around midnight. Both the switching-on rate and the switching-off rate show multiple bursts, with significant spikes aligning closely with hour or half-hour boundaries. The alignment may be due to many users turning on televisions in anticipation of the start of television programs, and many users turning off the televisions after watching television programs. Television programs typically start and end near hour or half-hour boundaries.

FIG. 5 includes a complementary cumulative distribution function of the length of channel-sessions. Channel-sessions curve 506 shows the data for channel-sessions. The length of a channel-session is a duration of time from a last channel switch, which may be turning on the set-top box device, until the next channel switch, which may be turning off the set-top box device. The channel-sessions curve 506 has a long tail, although not as heavy as those of the on-session curve 502 and the off-session curve 504.

Figure 9:
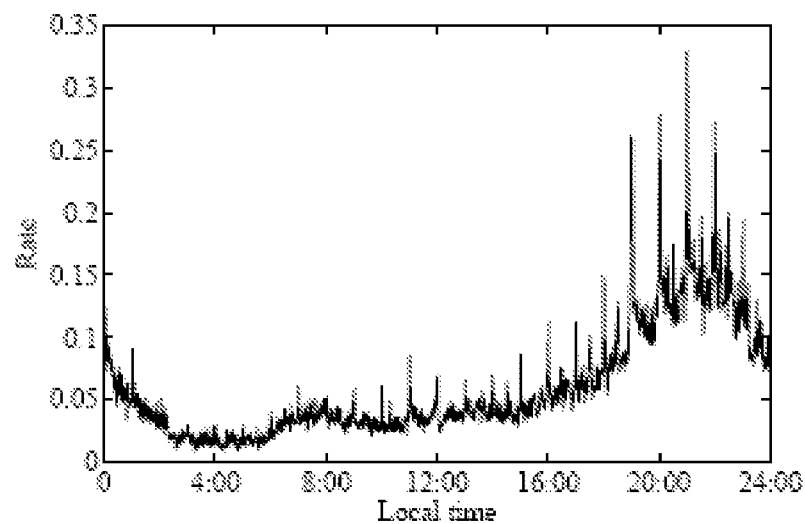
FIG. 9 is a graph of rate versus local time for channel session events.

FIG. 9 depicts a one-day time series of event rate for channel switching events. Compared to switching-on/switching-off event rates, the channel switching events demonstrate even stronger spikes with the period of 30 minutes. This alignment may be due to correlated user activities related to television program alignment. Many users switch channels together when a television program ends, which may create temporarily high workload on the IPTV servers.

Channel switching may be categorized as sequential-scanning and target-switching. Sequential-scanning represents users in channel-browsing mode by going through the available channels using the up/down buttons on remote controllers, while target-switching represents users intentionally switching to specific channels of choice. Channel switches between adjacent channels were assumed to be sequential-scanning and the rest were assumed to be target-switching. To define the channel adjacency, a list of available channels was inferred. The list of channels may be different from one user to another due to different subscription plans or other factors. All channels that a set-top box device requests over an extended period (e.g., a month) were tracked. The channels were regarded as the list of available channels. Nearly 700 different channels appeared in the data.

From the first data set, about 56% of channel switching events were considered to be sequential-scanning. Among sequential-scanning, about 72% of the channel switching events were attributable to up button activation, and about 28% to down button activation.

The remaining 44% of channel switching events were attributed to target-switching. A larger than expected ratio of target-switching to sequential-switching may be attributed to features provided to the users, including user-customized favorite-channels lists accessed by buttons on the remote control, program menus where users can browse and switch to channels by name (e.g., electronic program guides), and easy access to DVR programs.

Figure 10:
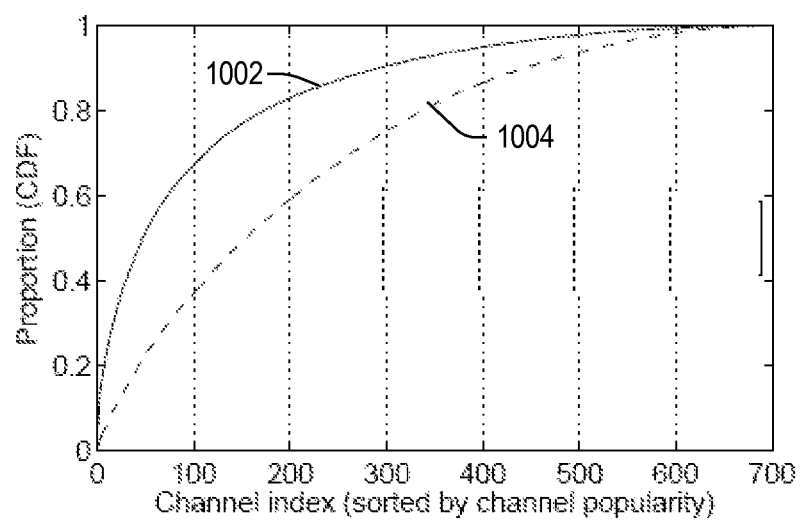
FIG. 10 is a graph showing the cumulative distribution function for channel dwell time and channel access frequency.

The nearly 700 different channels that appeared in the first set of data were ranked according to request count or channel access frequency and total time set-top box devices stayed tuned to channels or channel dwell time. FIG. 10 shows the cumulative distribution function of channel popularity ranked by channel access frequency and channel dwell time. The distribution of channel dwell time curve 1002 is highly skewed with the top 100 channels accounting for around 63% of the total channel dwell time. Channel access frequency curve 1004 is less skewed, which may be attributed to the large number of sequential-scanning channel switch events. Similar levels of skew in the distribution of channel popularity were present for different subsets of the first data set (e.g., by different time zones or by different date), although the ranking of the channels varied from one subset to another.

Figure 11:
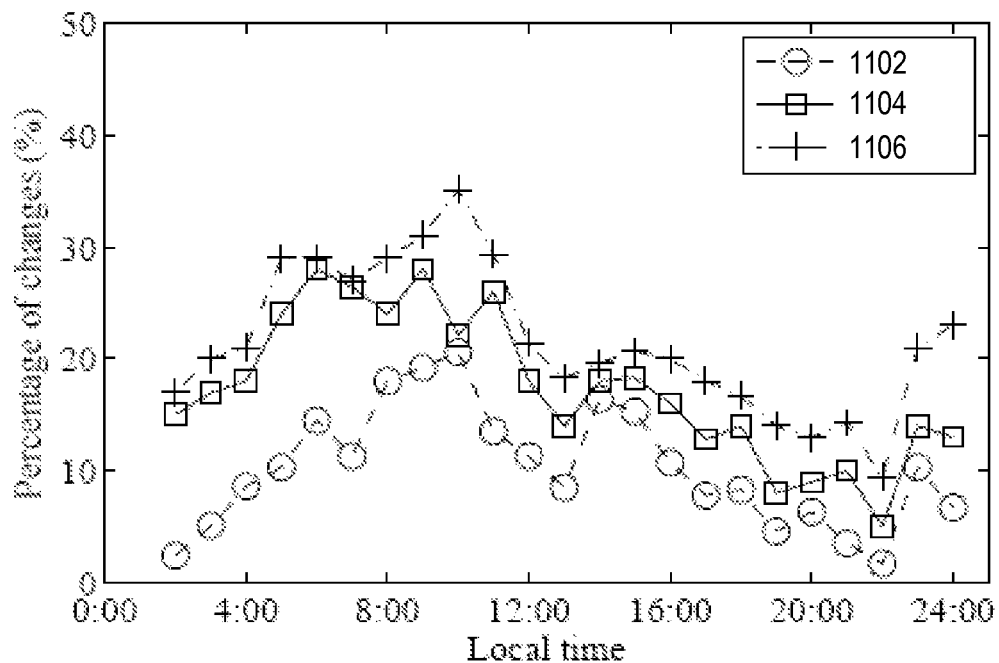
FIG. 11 is a graph depicting a ratio of change in popular channels during for a day.

FIG. 11 depicts how the top 10 popular channels (curve 1102), the top 50 popular channels (curve 1104), and the top 100 popular channels (curve 1106) change in the two adjacent hours during a day. The change percentages are averaged over the 6-day data. Channel popularity is relatively stable over time of day. For example, in FIG. 11, among top 100 channels at noon, less than 20% of them did not belong to top 100 channels at 1 PM, while more than 80% of them were among top 100 channels at both time periods. The relative channel popularity changes the most during morning hours, but remains moderately stable for most of the day.

Figure 12:
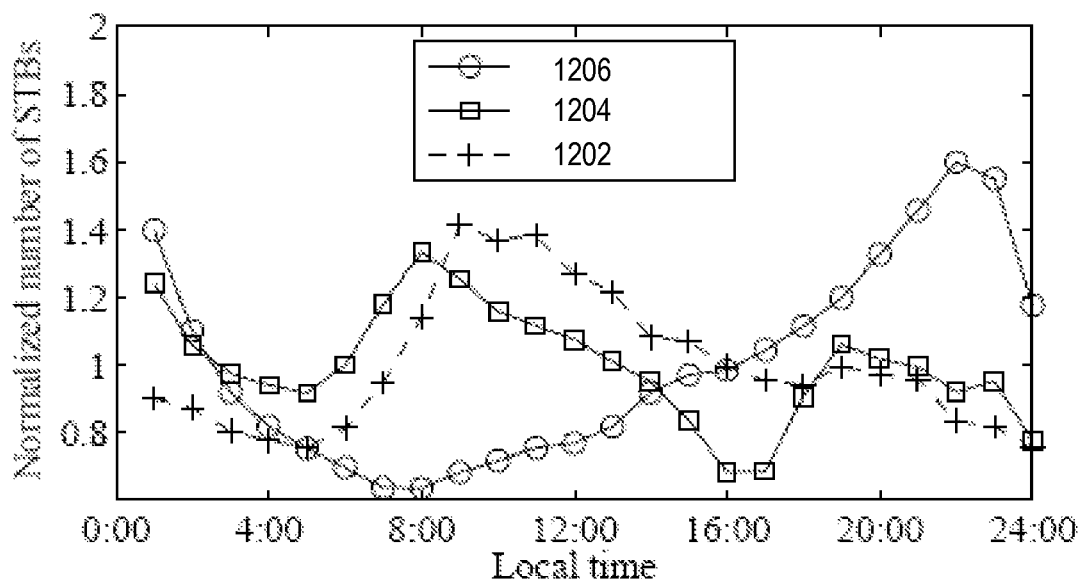
FIG. 12 is a graph of hourly channel popularity distribution change for recorded television, a local news channel, and a popular children channel.

FIG. 12 depicts an example of the dynamics of channel popularity within a day, in which normalized numbers of set-top box devices tuned to a top-ranked children channel (curve 1202) and a top-ranked local news channel (curve 1204) are compared to normalized numbers of set-top box devices tuned to a virtual channel corresponding to users watching recorded television programs (curve 1206). The local news channel curve 1204 peaked in the morning when users may watch early news and weather forecast before going to work. The children channel curve 1202 sharply lost popularity after 8 pm, which may be due to bedtimes for a significant number of children. In comparison, the DVR channel curve 1206 had the most dramatic change in scale and peaks late in the night.

Mathematical models may be used to capture observed characteristics of user activities. Switching-on, switching-off and channel-switching for set-top box devices were modeled. For each model, timing properties in both the session length distribution and the dynamics of the aggregate rate were matched. Channel popularity properties, including popularity and temporal dynamics, were also modeled for channel-switching. The parameters for the models were derived from the first data set.

A mixture-exponential model for on-session, off-session, and channel-sessions was used to capture the long tails exhibited in the empirical session length distributions of FIG. 5. A probability density function (PDF) of a mixture-exponential distribution is:

$$f(x) = \sum_{i=1}^{n} a_i \lambda_i e^{-\lambda_i x} \quad \text{Eqn (1)}$$

where $1/\lambda_i$ is the mean of the i-th exponential distribution in the mixture and $\Sigma_{i=1}^{n} a_i = 1$. The mixture-exponential model was selected due to its simple form and its capability in approximating heavy tailed distributions in a wide range.

Figure 13:
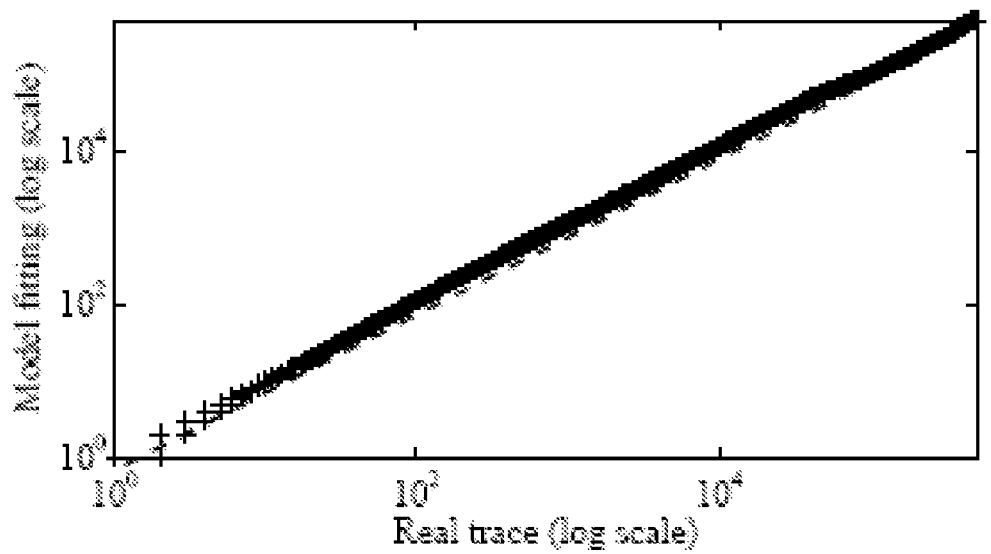
FIG. 13 is a quantile-quantile plot for the length of on-sessions.

To determine the model parameters that best describe the first data set, data fitting was applied to the on-sessions, off-sessions, and channel-sessions, respectively. In the following, the procedure used to model the channel-sessions model is presented. Substantially the same procedure may be applied to fit the on-sessions model and the off-sessions model. Different values for the number of exponential distributions, n, may be iteratively explored. For a given n, an expectation maximization algorithm may be applied to find the maximum likelihood estimate for the parameters $\lambda_i$ and $a_i$. For the length distribution of channel-sessions, n may be chosen to be 3 to obtain a close match to the data with a small number of model parameters (i.e., 6 model parameters). Table 1 depicts the model parameters that were found to fit the first data set. FIG. 13 depicts a quantile-quantile plots for the length of on-sessions. The plot demonstrates a good match between the models and the data. Quantile-quantile plots for the length of off-sessions and the length of channel-sessions also show good matches between the models and the data.

TABLE 1

|  | $\lambda_1$ | $\alpha_1$ | $\lambda_2$ | $\alpha_2$ | $\lambda_3$ | $\alpha_3$ |
| --- | --- | --- | --- | --- | --- | --- |
| On-session | 1.3e−2 | 0.3 | 3.3e−3 | 0.66 | 2.3e−4 | 0.04 |
| Off-session | 3.2e−2 | 0.19 | 2.5e−3 | 0.75 | 2.4e−4 | 0.06 |
| Channel-session | 2.1 | 0.23 | 2.6e−2 | 0.64 | 3.2e−3 | 0.13 |

For channel-sessions, the different $\lambda_i$ corresponds to Poisson processes with average inter-arrival time of around 30 seconds, 40 minutes and 5 hours. These values may represent an IPTV user in a state of channel browsing, of television program watching, and of being away from the television, respectively. The likelihood of a user entering these modes is quantified by the $a_i$ values. Similar observation may be made for the on-session parameters and the off-session parameters.

The mixture-exponential models above imply a constant-rate stochastic process with a mean event rate equal to $1/(\Sigma_i a_i \lambda_i)$. However, as shown in FIGS. 7-9, the aggregate event rate for switching-on, switching-off, and channel-switches are all highly variant and include many apparently-periodic spikes. The user activities are influenced by television program schedules. As a result, the user activities are correlated to each other and are not independent.

Figure 14:
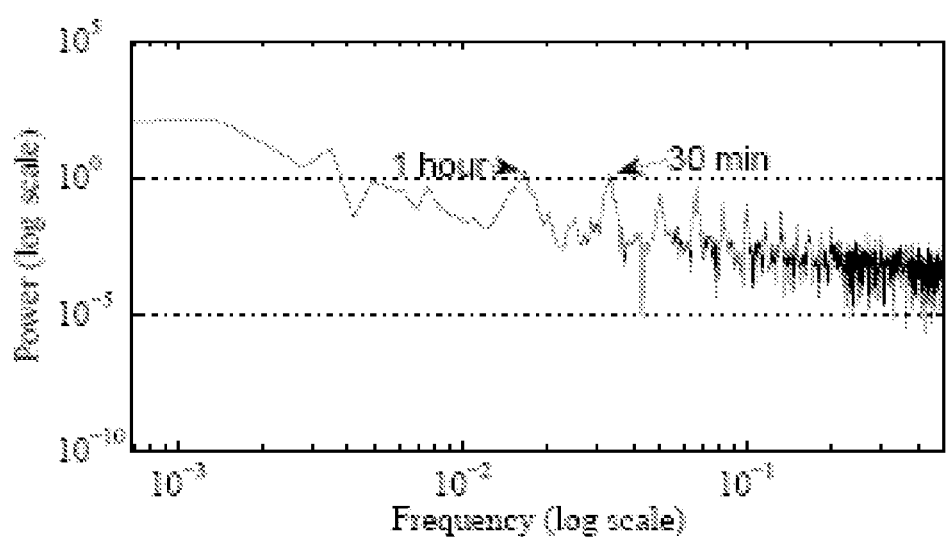
FIG. 14 depicts time-varying rates in a frequency domain for switching-on of set-top box devices.
Figure 15:
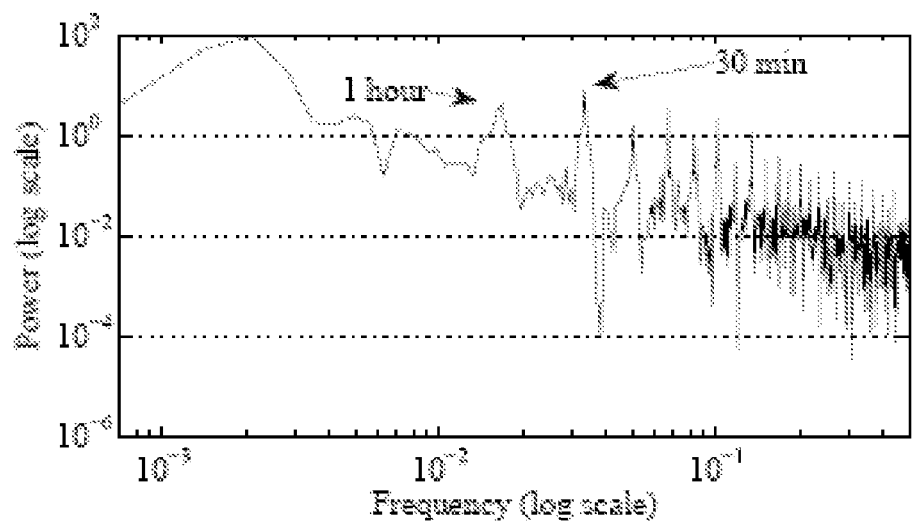
FIG. 15 depicts time-varying rates in a frequency domain for switching-off of set-top box devices.
Figure 16:
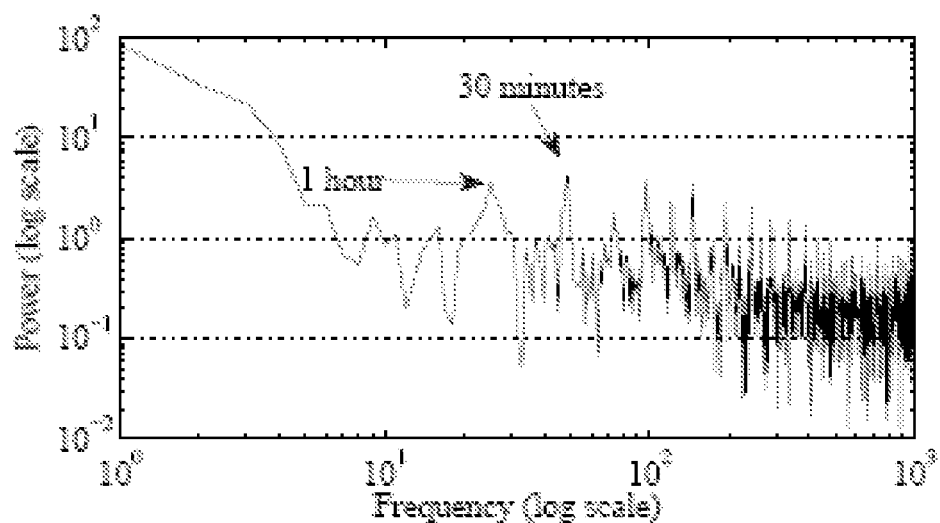
FIG. 16 depicts time-varying rates in a frequency domain for channel switch sessions of set-top box devices.

The aggregate event rates appear very complicated in the time domain and a large number of parameters would be required to characterize the curves. Instead of using the time domain, an approach of using a frequency domain was used. The results of applying a fast Fourier transform to the event time series are depicted in FIG. 14 for the switching-on data, in FIG. 15 for the switching-off data, and in FIG. 16 for channel-switch data. There are a few of distinct spikes at frequencies that correspond to 1 hour, 30 minutes, 15 minutes etc., and an ambient gradual decrease in the power level (y-axis) from low to high frequencies for each of FIGS. 14-16. The ambient power level may be approximated by using a Weibull distribution. The ambient power level probability density function is:

$$f(x; k, \mu) = \frac{k}{\mu}\left(\frac{x}{\mu}\right)^{k-1} e^{-(x/\mu)^k} \qquad \text{Eqn (2)}$$

where $k$ and $\mu$ are model parameters. The Weibull distribution was chosen to approximate a wide range of classes of functions including exponential, normal and lognormal with only two parameters. The model parameters that best match the first data set are reported in Table 2.

TABLE 2

|  | k | μ | $p_{1\text{-}hour}$ | $p_{30\text{-}min}$ | $p_{15\text{-}min}$ |
|---|---|---|---|---|---|
| Switching-on | 0.0036 | 278 | 1.76 | 1.41 |  |
| Switching-off | 0.0316 | 233 | 4.43 | 7.85 |  |
| Channel-switch | 0.03840 | 293 | 4.23 | 5.34 | 4.53 |

Figure 17:
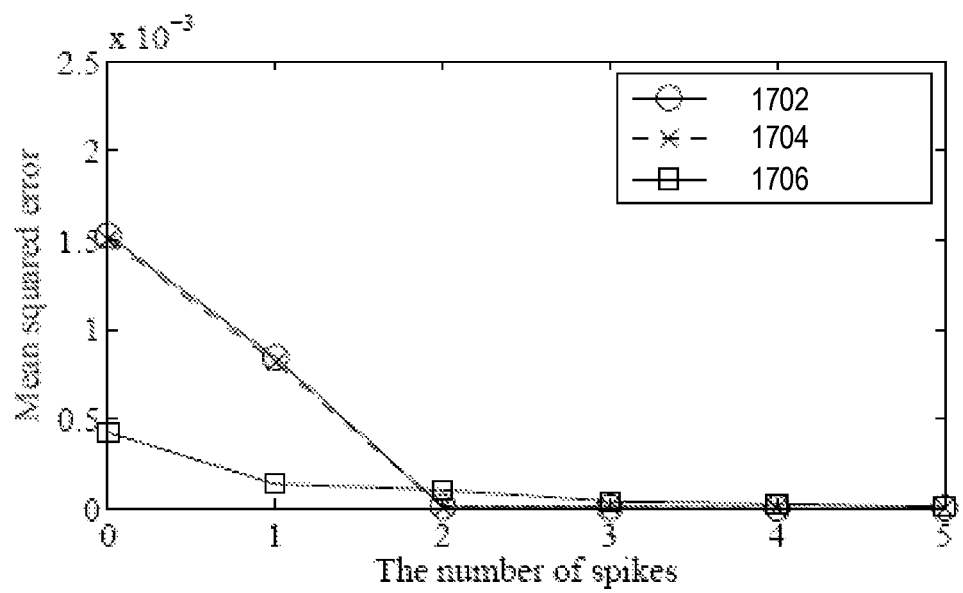
FIG. 17 depicts a graph of mean squared error versus a number of spikes to facilitate determination of a number of spikes to include in a model.

From only a small number of parameters ($k$, $\mu$, and the values for the spikes (i.e., $p_{1\text{-}hour}$, $p_{30\text{-}min}$, and $p_{15\text{-}min}$) and in the frequency domain), frequency domain functions may be generated. Inverse fast Fourier transforms may be applied to the frequency domain functions to reconstruct the time series that initially seemed highly complex. To determine the best trade-off between the number of spikes to explicitly include in the model and the quality of the match between the model and the empirical trace, a discrepancy metric as a function of the number of spikes in the model is presented as FIG. 17. The discrepancy metric is the mean squared error between the data and the model output. A switch-on curve 1702, a switch-off curve 1704, and a channel-switch curve 1706 are presented in FIG. 17. The discrepancy metric becomes negligible when two spikes are chosen for switching-on and switching-off. The discrepancy metric also becomes negligible when three spikes are chosen for channel switch.

Figure 18:
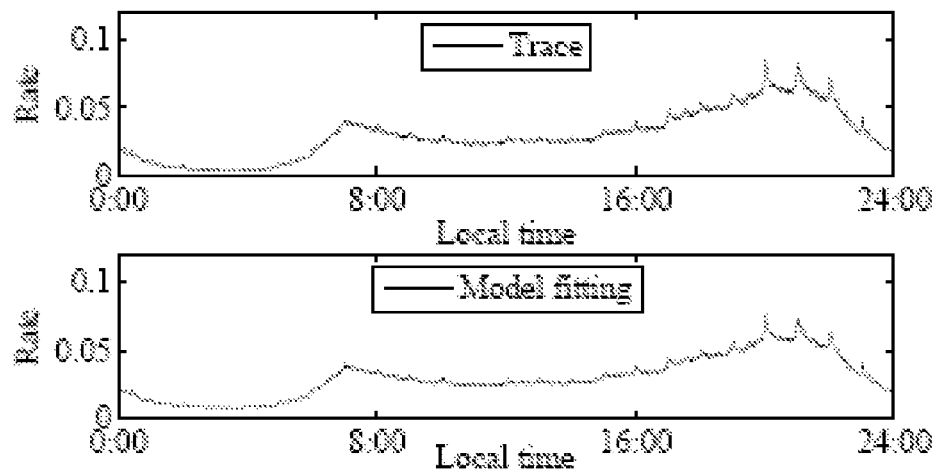
FIG. 18 depicts aggregate event rate versus local time for switching-on of set-top box devices from data in an upper graph and aggregate event rate versus local time for switching-on of set-top box devices from a model in a lower graph.
Figure 19:
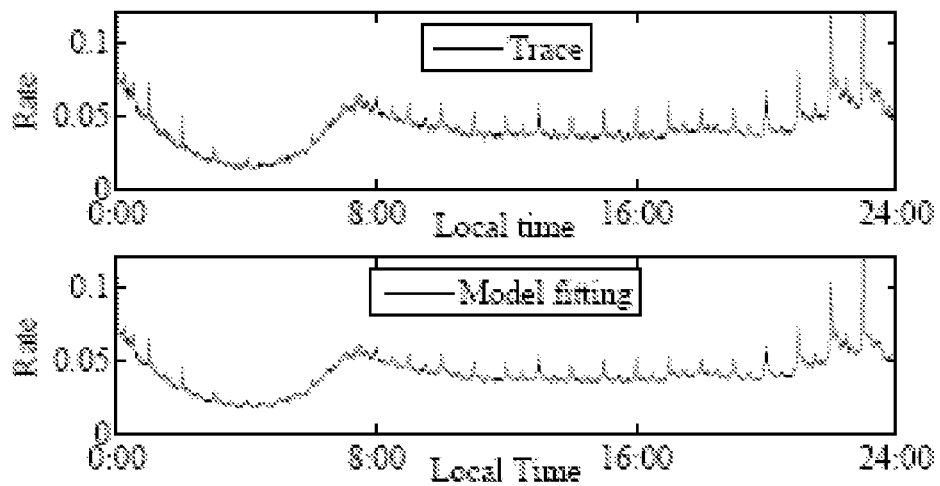
FIG. 19 depicts aggregate event rate versus local time for switching-off of set-top box devices from data in an upper graph and aggregate event rate versus local time for switching-off of set-top box devices from a model in a lower graph.
Figure 20:
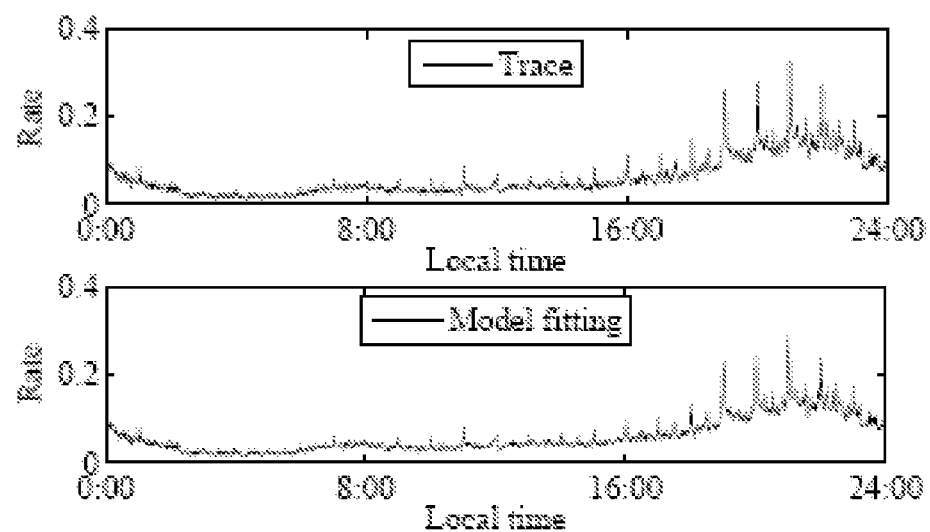
FIG. 20 depicts aggregate event rate versus local time for channel-switching of set-top box devices from data in an upper graph and aggregate event rate versus local time for channel-switching of set-top box devices from a model in a lower graph.

FIG. 18 compares the first data set (top) with the result from the model (bottom) for switching-on of set-top box devices. FIG. 19 compares the first data set (top) with the result from the model (bottom) for switching-off of set-top box devices. FIG. 20 compares the first data set (top) with the result from the model (bottom) for channel-switching of set-top box devices. The modeled curves appear to match well with the first data set, even when only 13 parameters ($k$, $\mu$ and the values for the 2-3 spikes in Table 2) are used.

The time series functions obtained from the above process are defined as rate moderating functions $g(t)$. The rate moderating functions model the impact of external television schedules on user activities. Since each $g(t)$ is constructed from data in a given window W, (e.g., W=86,400 seconds, or 1 day), $g(t)$ may be repeated to make it a periodic function: $g(t+W)=g(t)$. Furthermore, $g(t)$ may be normalized such that $\int_0^w g(t)dt=W$. The periodic moderating function, g, will not impact the tail behavior of the session length distributions modeled previously. The periodic moderating function may change the shape of session length distribution at small durations. In particular, depending on the start time-of-day, the session length distribution may vary.

Figure 21:
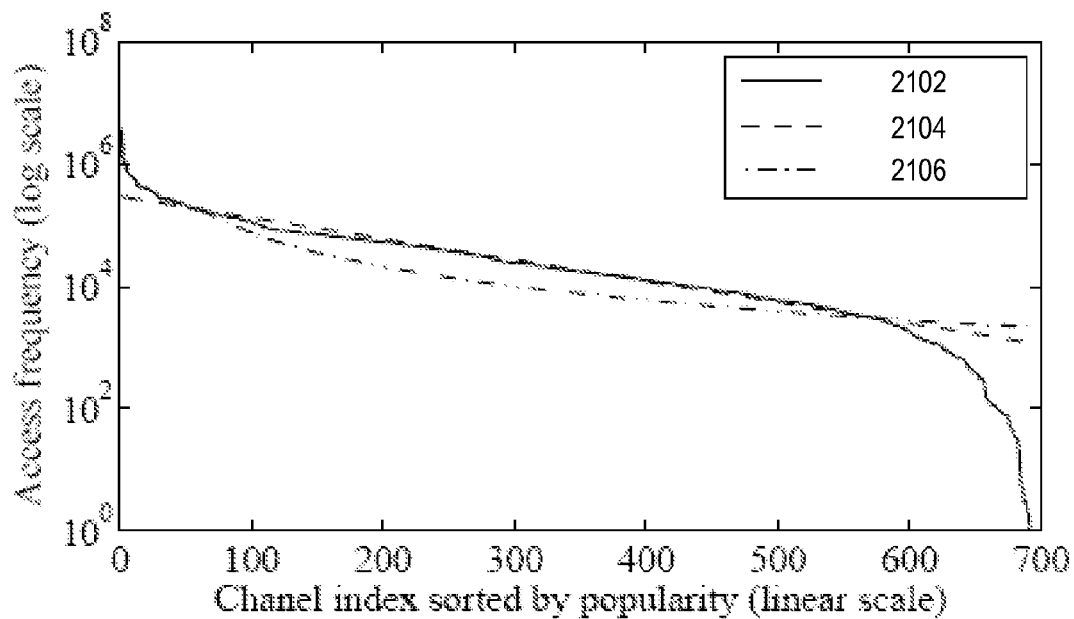
FIG. 21 depicts channel popularity distributions.

FIG. 21 depicts channel popularity distribution. Real trace curve 2102 shows the channel popularity curve obtained from the first data set. Curve 2104 shows the channel popularity curve obtained using an exponential function. Curve 2106 shows the channel popularity curve obtained using a Zipf-like distribution model. Since channel popularity is skewed, the Zipf-like distribution may be used to model channel access frequencies of the most popular channels and the exponential function may be used to model channel access frequencies of the main body of the channels. The Zipf-like distribution is:

$$f_1(i) = C_1 i^{-\alpha} \qquad \text{Eqn (3)}$$

The exponential function is:

$$f_2(i) = e^{-\beta i + C_2} \qquad \text{Eqn (4)}$$

Parameters for Eqn (3) and Eqn (4) that fit the real trace data for specific regions are presented in Table 3.

TABLE 3

|  | α | $C_1$ | β | $C_2$ |
|---|---|---|---|---|
| $f_1(i)$ | 0.513 | 12.642 |  |  |
| $f_2(i)$ |  |  | 0.006 | 2.392 |

A hybrid model may be used to model the channel popularity distribution to have a close fit for the most popular channels and for the main body of the channels. The hybrid model may be expressed as:

$$f_0(i) = \begin{cases} C_1 i^{-\alpha}/C_0 & i < 10\% \text{ of available channels,} \\ e^{-\beta i + C_2} C_0 & \text{Others} \end{cases} \qquad \text{Eqn (5)}$$

where $C_0$ is a normalization factor such that $f_0(\bullet)$ is a well defined probability density function. The hybrid distribution function achieves a good match for the top 600 popular channels, which together account for over 97% of the channel-switches (as shown in FIG. 10).

Channel popularity in terms of channel access frequencies may only be applicable to target-switching. For sequential-scanning, the channel number simply increments or decrements. The probability of a user entering target-switching mode is defined as $p_t$, which is 0.44 from the first data set. The probability of a user entering sequential-scanning mode is $1-p_t$. When in sequential-scanning mode, a user switches to a higher number with the probability of $p_u$ (0.72 in the first data set), and to a lower number with $1-p_u$.

To align channel identification to the channel popularity, a simple random permutation method was used. The ranks of the channel popularity were randomly shuffled and used as the channel identification. This method may not capture a clustering effect in a commercial channel listing of similar channels being positioned next to each other (e.g., a music channel may be placed next to other music channels in a commercial listing).

The channel popularity model of Eqn (5) captures the skew of channel popularity, which is relatively stable at a large time scale. The time scale may be a day or longer. The first data set also indicates that channel popularity exhibits some temporal patterns throughout a day, as shown in FIG. 12.

Channel popularity may be estimated based on dwell time and based on access frequency. There is a correlation between these two popularity measures. For simplicity, the channel access frequency was used as the metric for channel popularity. A second data set was used to develop channel popularity dynamics. The second data set was for the nationwide IPTV system in the United States for a period of one month (June 2008). The second data set was limited to data from the Eastern time zone. Data from other time zones for the month yielded results that were quantitatively similar.

Figure 22:
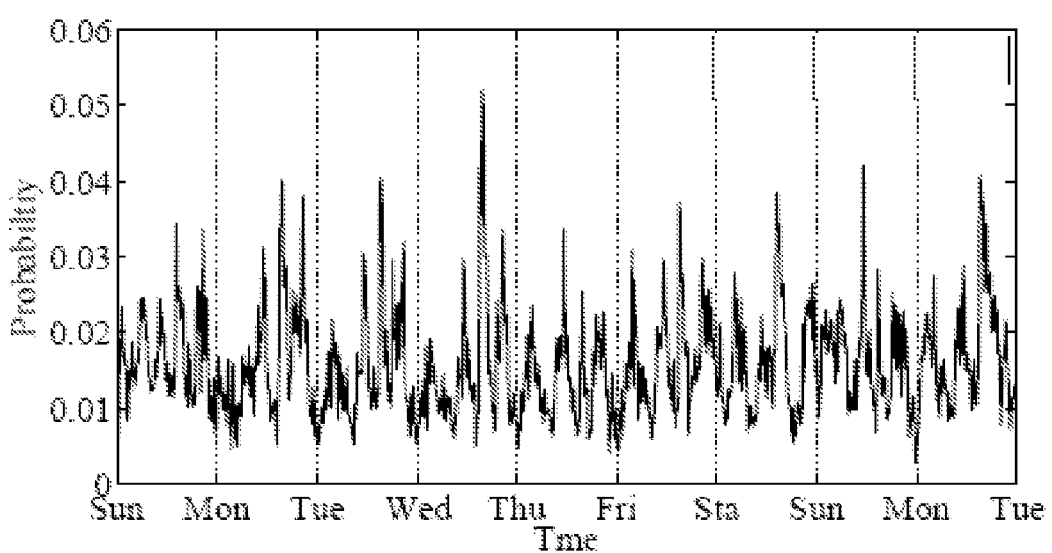
FIG. 22 depicts dynamics of channel popularity of a children content channel, where a data point was taken every 15 minutes.
Figure 23:
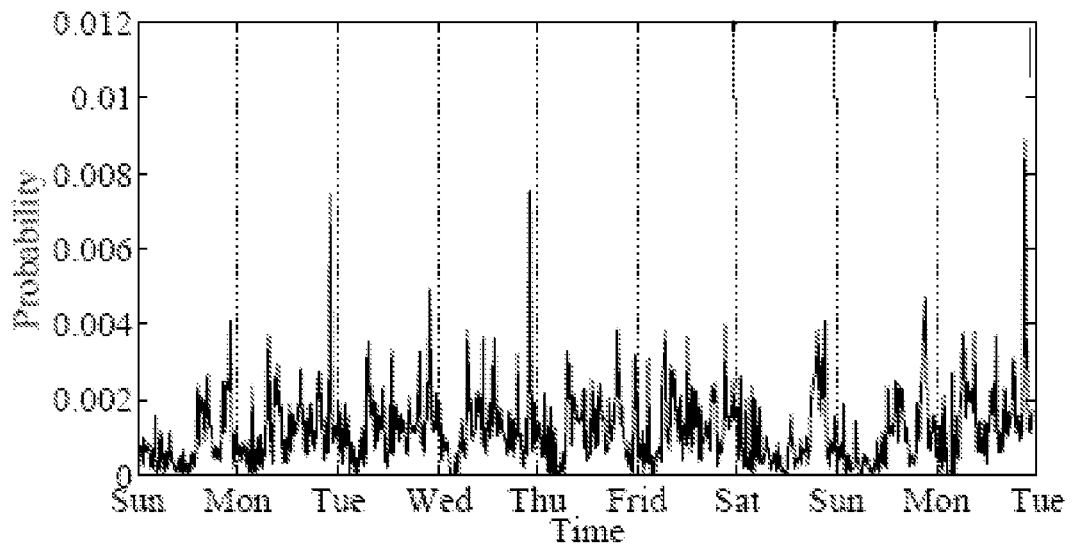
FIG. 23 depicts dynamics of channel popularity of a news content channel where a data point was taken every 15 minutes.

FIGS. 22 and 23 depict time series of nine days for a popular child content channel K and a popular news content channel N, respectively using the second set of data. Both time series exhibit fluctuations over time. Both time series show diurnal patterns in channel access popularity. A non-parametric runs test may be applied to analyze the stationarity of the channel popularity series. Given a time series X(t), the runs test works as follows:
(i) divide the series into equal-length time intervals ("bins") and compute a mean value $\overline{X}_i$ for each bin,
(ii) compute the median value of $\overline{X}_i$ over all bins and mark the ones below the median as "−" and the rest as "+",
(iii) consider a consecutive sequence of "+" or a consecutive sequence of "−" as a run and count the total number of runs, and
(iv) compare the number of runs against known run-count-distribution for stationary random data.

At the 95-th percentile confidence interval, 92% of the channels passed the stationarity test when aggregated at 15-minute intervals. A small number of channels that failed the runs test exhibited non-trivial daily pattern.

Figure 24:
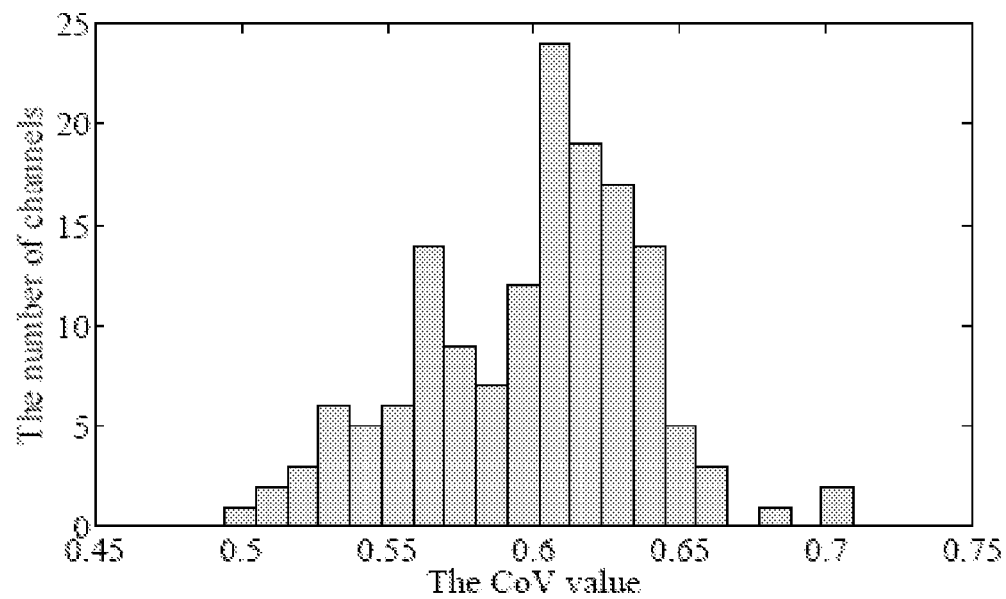
FIG. 24 depicts the distribution of the coefficient of variation (CoV).

A coefficient of variation (CoV) was calculated for the channel popularity series. FIG. 24 shows the distribution of CoV's of the channels. Despite differences in mean value, the CoV's of the channel popularity series are narrowly centered about 0.6. For example, the CoV for the series of the child content channel K of FIG. 22 was 0.57 and the CoV for the series of the news content channel N of FIG. 23 was 0.68.

An autocorrelation function (ACF) was defined as:

$$R(\tau) = \frac{E[(X_t - \mu)(X_{t+\tau} - \mu)]}{\sigma^2} \quad \text{Eqn (6)}$$

Figure 25:
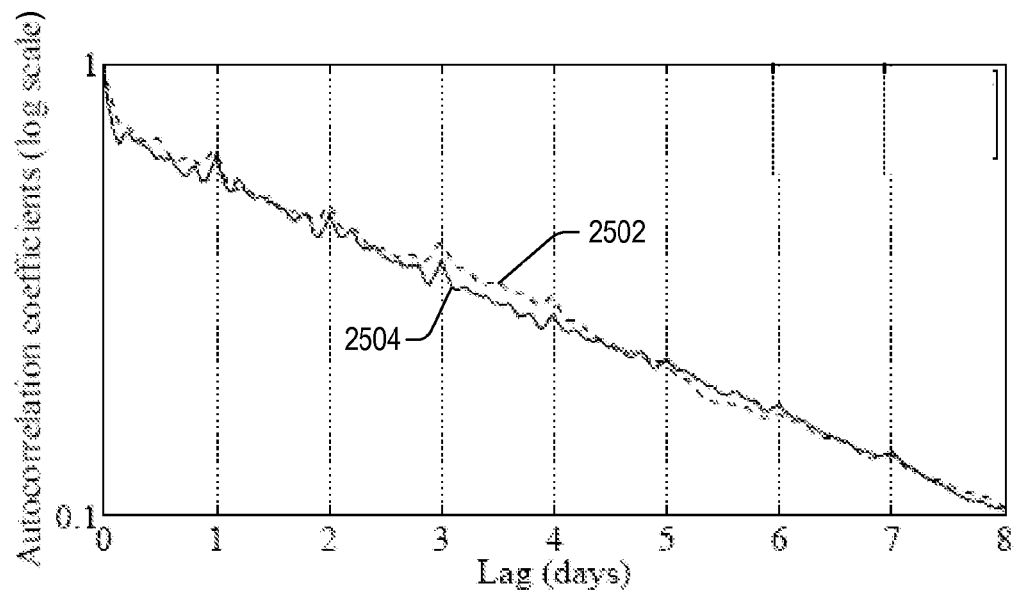
FIG. 25 depicts the autocorrelation function of the children content channel of FIG. 22 and the autocorrelation function of the news content channel of FIG. 23.

FIG. 25 depicts the ACF of the channel popularity series of the child content channel K depicted in FIG. 22 and the news content channel N depicted in FIG. 23. Curve 2502 is the ACF for the child content channel K and curve 2504 is the ACF for the news content channel N. Other channels had similar behavior. FIG. 25 shows exponential decay of the autocorrelation function of channel popularity. The exponential decay may cause fast decreasing stability in short time scales. As the aggregation level becomes sufficiently large, the short term disturbances smooth out, converging to a long term average, which exhibits improved stability.

Figure 26:
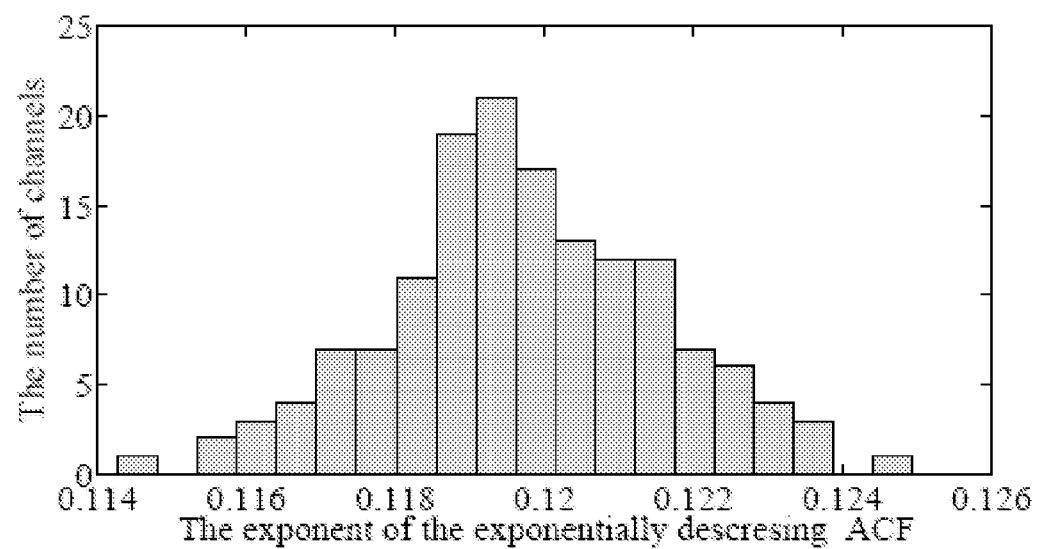
FIG. 26 depicts the distribution of the slopes of the autocorrelation function for the channels.

Lags range from 15 minutes to 8 days in FIG. 25. Small increases at the lags around day boundaries (1 day, 2 days, etc.) may imply that there are diurnal patterns in the channel popularity. The roughly straight lines indicate that the auto-correlation decays exponentially as time lag increases. This behavior may be observed in auto-regression processes. Slopes of the decreasing curves, which are the exponents of the exponentially decreasing ACF, are similar among all channels. Using least square fitting, a best estimate of the exponent for each channel was obtained. A distribution of exponents from the least square fitting is depicted in FIG. 26. The value of the exponents concentrated at around 0.12.

Figure 27:
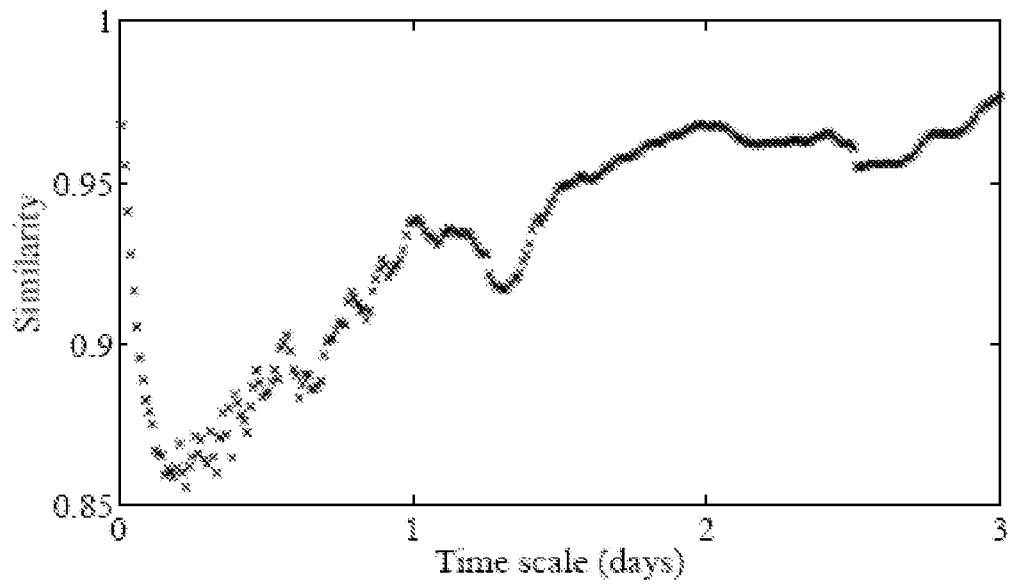
FIG. 27 depicts the average cosine similarity for different aggregation time scales.

Cosine similarity may be used to measure the similarity between two vectors by finding the cosine value of an angle between the vectors. Values of cosine similarity range between −1 and 1, with values closer to 1 indicating higher similarity between the two vectors. Cosine similarity may be used to quantify the similarity or dissimilarity of the channel popularity collectively among all channels. Cosine similarity shows that channel popularity is relatively stable over time. The average cosine similarity between adjacent 15-minute time bins was around 0.97, indicating that the distribution of the channel popularity was quite stable in a short time frame. The second set of data was discretized by fixed-interval time bins. Interval lengths ranged from 15 minutes to 3 days. At each interval, the channel access probability of different channels was calculated for each time bin. For each pair of adjacent time bins, the cosine similarity of channel popularity vectors was calculated. Based on these values, the average for each aggregation interval was calculated. FIG. 27 shows the result where the x-axis is the aggregation time scale (interval length) and the y-axis is the average similarity.

The curve of FIG. 27 forms a V-shape as the aggregation increases. The similarity value first decreases as the aggregation times increases, reaching its minimum at around 3-4 hour aggregation scale. After that, an increasing trend is observed as the aggregation time scale increases. When the time scale is short, the similarity/dissimilarity of the channel popularity may be determined by the television program (shows) of the time. On the other hand, when the time scale is long, the similarity/dissimilarity may be determined by the overall type of television program on the channels. Both the viewer base of individual television shows and the long term user affinity to the type of program may be relatively more stable, which makes the time scale in between the weakest in teem of channel popularity stability.

Figure 28:
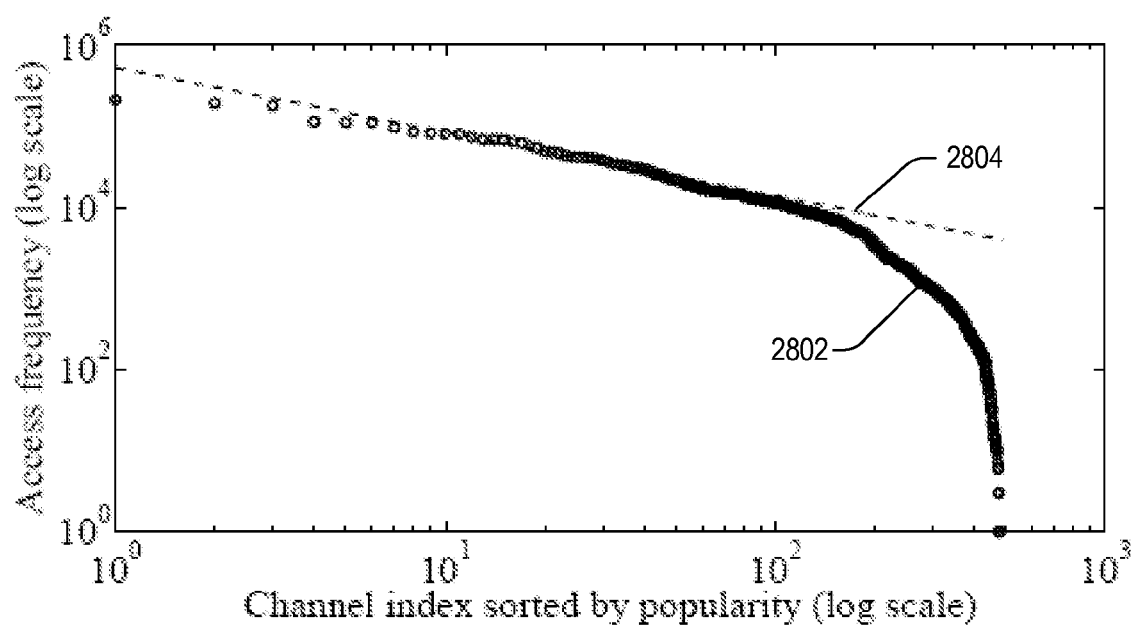
FIG. 28 depicts channel popularity distribution.

A Zipf-like distribution, such as Eqn. (3), may be used to model channel popularity. FIG. 28 depicts the access frequencies of all channels in the order of decreasing popularity. Real trace 2802 corresponds to data from the second set of data. Curve 2804 corresponds to the fitted Zipf-like distribution with the parameter α set to 0.55. Curve 2804 shows a good match up to around 150 channels, which accounts for 98% of the channel-switches for the second set of data.

A mean reversion model may be chosen to model the temporal dynamics of channel popularity. Ornstein-Uhlenbeck (OU) process $\{X_t: t>0\}$ is a mean reverting stochastic process. The OU process may be characterized by the following linear stochastic differential equation:

$$dX_t = \lambda(\mu - X_t)dt + \sigma dW_t \quad \text{Eqn (7)}$$

where $\lambda>0$ is the mean reversion rate, $\mu$ the long-term mean, and $\sigma$ the volatility. $W_t$ denotes a Wiener process (also known as Brownian motion), which is characterized by: (i) $W_0=0$, (ii) $W_t$ is almost surely (i.e., with probability one) continuous, and (iii) $W_t$ has independent increments with distribution $W_t - W_s \sim \mathcal{N}(0, t-s)$ for $0 \le s < t$.

The right hand side of Eqn (7) may be viewed as a summation of a deterministic term (the first term in the right hand side) and a stochastic term (the second term in the right hand side). When $X_t>\mu$, the deterministic term $\lambda(\mu-X_t)$ is negative, resulting in pulling back down toward the equilibrium level (i.e., $\mu$); when $X_t<\mu$, the deterministic term is positive, pushing $X_t$ back up to the equilibrium level. As a result, every time the stochastic term makes $X_t$ deviate from the equilibrium, the deterministic term will act in such a way that $X_t$ will head back to the equilibrium $\mu$.

The OU process has moments:

$$E(X) = \mu \quad \text{Eqn (8)}$$

$$\text{Cov}(X_s, X_t) = \frac{\sigma^2}{2\lambda} e^{-\lambda|s-t|} \quad \text{Eqn (9)}$$

The moments imply that the autocorrelation function of an OU process decays exponentially as the lag $|s-t|$ increases, which matches well with the empirical ACF of channel popularity series depicted in FIG. 25.

The long term equilibrium $\mu$ can be derived from Eqn (8), which may be further modeled by a Zipf-like distribution. From Eqn (9), the autocorrelation decreases with lag at the rate $e^{-\lambda}$. The value of $\lambda=0.12$ obtained from FIG. 26 may be used. Using Eqn (9), $\sigma$ may be derived as follows:

$$\sigma = \mu \times \sqrt{2\lambda} \times \text{CoV} \quad \text{Eqn (10)}$$

Fixed time steps of 1 may be used to obtain a discrete version of the OU process and derive a first-order autoregressive sequence of $X_t$ as:

$$X_{i+1} = X_i e^{-\lambda} + \mu(1 - e^{-\lambda}) + \sigma \sqrt{\frac{1 - e^{-2\lambda}}{2\lambda}} \mathcal{N}_{0,1} \quad \text{Eqn (11)}$$

where $\mathcal{N}_{0,1}$ is a standard Gaussian random variable. Eqn (11) can be used to drive simulation of IPTV channel popularity.

Figure 29:
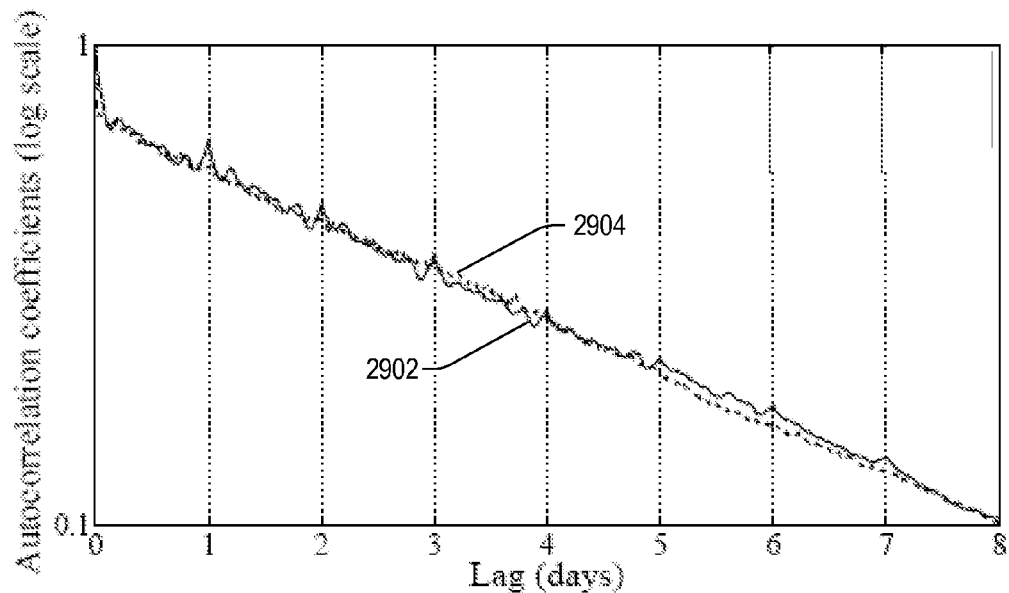
FIG. 29 depicts a comparison of the autocorrelation function determined from data with the autocorrelation function determined by a mean reversion process single-class model.
Figure 30:
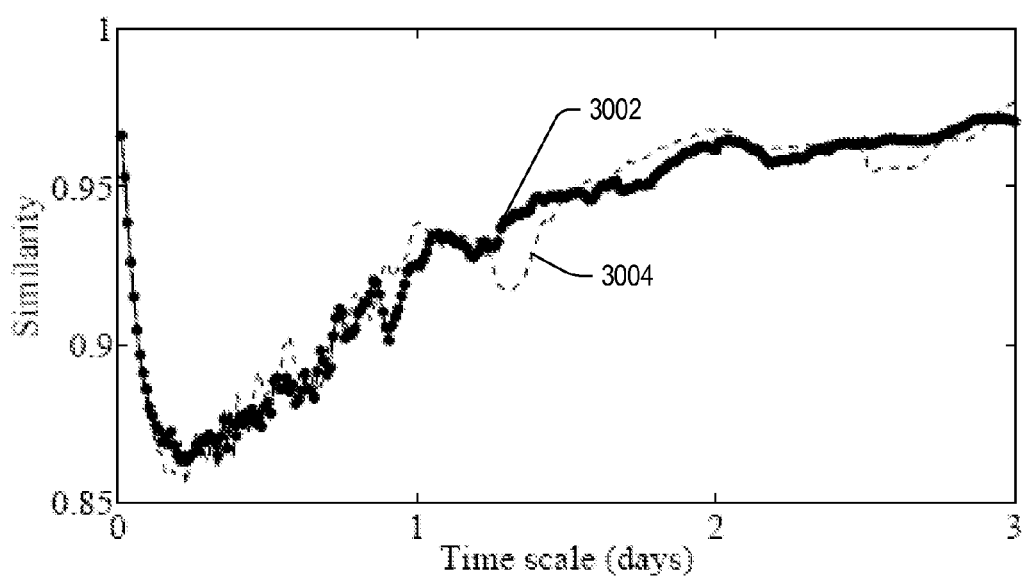
FIG. 30 depicts cosine similarity determined from data with cosine similarity determined by a mean reversion process single-class model.

The model described by Eqns (7)-(11) was validated against measured data. FIG. 29 shows ACF versus lag. Real trace 2902 shows data obtained from the second set of data. Curve 2904 shows data obtained from the model with $\lambda=0.12$. With the exception of surges at lags that are multiples of one day, there is a good match between the real trace 2902 and the curve 2904. FIG. 30 shows cosine similarity versus a time scale. Real trace 3002 shows data obtained from the second set of data. Curve 3004 shows data obtained from the model. The model reproduced the V-shaped behavior in the cosine similarity of channel popularity vectors.

The model described by Eqns (7)-(11) may be used to perform forecasting. For example, given the historical states from $X_0$ to $X_i$ for a channel, the model may be used to predict $X_{i+1}$. The prediction may be viewed as a linear regression problem. To facilitate the regression analysis, Eqn (11) may be rewritten as:

$$X_{i+1} = \alpha X_i + b + \epsilon \quad \text{Eqn (12)}$$

Using least squares criterion, model parameters may be obtained as follows:

$$a = \frac{nX_{xy} - X_x X_y}{nX_{xx} X_x^2} \quad \text{Eqn (13)}$$

$$b = \frac{X_y - aX_x}{n} \quad \text{Eqn (14)}$$

-continued $$sd(\epsilon) = \sqrt{\frac{nX_{yy} - X_y^2 - a(nX_{xy} - X_x X_y)}{n(n-2)}} \quad \text{Eqn (15)}$$

where $$X_x = \sum_{i=1}^{n} X_i - 1, \quad X_y = \sum_{i=1}^{n} X_i$$

$$X_{xx} = \sum_{i=1}^{n} X_{i-1}^2, \quad X_{xy} = \sum_{i=1}^{n} X_{i-1} X_i, \quad X_{yy} = \sum_{i=1}^{n} X_i^2$$

The data for the news content channel N was used to evaluate the performance of the model. A small resulting mean squared error (MSE=$8\times10^{-8}$) was obtained compared to a mean value 0.0014 and variance $9.3\times10^{-7}$. This implies that the forecasting model predicts the dynamics of channel popularity reasonably well. Similar results were obtained for various other channels.

Although the model described by Eqns (7)-(11) works reasonably well, the model may not capture some diurnal patterns such as small increases around daily boundaries in ACF (see FIG. 29). Various groupings were explored to group the set-top box devices so that a multi-class popularity model could be developed that evidences diurnal patterns.

While a single-class channel popularity model might be sufficient for many applications (e.g., network capacity planning analysis), some other applications may benefit from modeling of channel popularity dynamics. For example, a model used to evaluate a peer-to-peer type content caching scheme for the IPTV scheme may take into consideration diurnal changes to provide results that are useful. One way of modeling such dynamics is to observe differences across multiple smaller time intervals (e.g., hourly granularity) and model the channel popularity in each small interval separately. Alternately, an understanding of the underlying structures and processes producing such dynamics can be obtained, and the underlying structures and processes can be modeled. Such an understanding may lead to a multi-class model as described below.

Attributes of the set-top box devices that provided data for the second data set were chosen. The attributes included television watching time, channel change frequency, dwell time per channel change, and location. Television watching time for each set-top box device considered various aspects of television watching time, such as daily average, hourly average, and average nightly watching time. Channel change frequency considered daily average and hourly average of channel changes to group set-top box devices. Dwell time per channel change determined how long a set-top box device stayed on a channel after switching to the channel. The dwell time may be reported long when a user does not watch the channel, but leaves the set-top box device on. Whether a user watches the channel could not be determined from the second data set. To minimize the effect, a median value of dwell time per channel was determined along with the average value of dwell time per channel. Location groups of the set-top box devices were based on where the set-top box devices were located (e.g., by cities where the set-top box devices were located).

The first 15 days of the second set of data were used to calculate the attributes for each set-top box device. The remaining data of the second set of data was used to evaluate the properties of the groupings. Two categories of groupings were examined, threshold-based groupings and clustering algorithm based groupings.

For the threshold-based groupings, a grouping attribute and a set of corresponding thresholds were selected to group the set-top box devices. The threshold-based groupings included: daily watching time (WT-D), daytime vs. nighttime (DN-D), daily channel change count (CHG-D), median dwell time (DWL), and location (LC).

For the WT-D grouping, the daily average television watching time for each set-top box device was considered. Specifically, a set-top box device was a heavy-watcher when the set-top box device was on more than 12 hours per day on average. The set-top box device was a light-watcher when the set-top box device was on less than 1 hour per day on average. The remaining set-top box devices were considered medium-watchers. In the second data set, about 28% of set-top box devices were heavy-watchers, and about 36% of the set-top box devices were light-watchers.

For the DN-D grouping, a set-top box device was defined as a daytime-watcher if the average television watching time during the day (from 6 am to 6 pm) is more than twice the average time during the night (from 6 pm to 6 am). A nighttime-watcher was defined similarly. The remaining set-top box devices were considered all-time-watchers. In the second data set, about 31% of set-top box devices were daytime-watchers and about 39% of set-top box devices were nighttime-watchers.

For the CHG-D grouping, the average channel change count per day was used. Set-top box devices that switched channels more than 200 times on average per day were frequent-switchers (about 24% of set-top box devices of the second data set), and set-top box device that switched the channel less than 10 times on average per day were infrequent-switchers (about 12% of set-top box devices of the second data set). The remaining about 64% of set-top box devices were moderate-switchers.

For the DWL grouping, the median value of the dwell time per channel change was used. Four groups were defined by using thresholds of 10 minutes, 20 minutes, and 30 minutes.

For the LC grouping, metropolitan areas were used to group the set-top box devices.

For the clustering algorithm based groupings, many different types of clustering algorithms were examined. Focus was placed on the results of the K-mean algorithm. The K-mean algorithm is effective for large data sets. In this algorithm, the number groups K is provided as an input parameter. While there are several ways to find K, the intra-cluster dissimilarity $W_K$ was used as the measure. The value for $W_K$ was calculated from the following equation:

$$W_K = \sum_{k=1}^{K} \sum_{C(i)=k} \|x_i - \hat{x}_k\|^2 \qquad \text{Eqn (16)}$$

where $x_i$ is the data item, and $\hat{x}_k$ is the center of items in k-th cluster. Separate grouping result and the corresponding $W_K$ for each K were obtained from varying $K \in \{1, 2, \ldots, K_{max}\}$. Considering a trade-off between dissimilarity and the number of clusters, a value of K was chosen. The groupings are all feature vectors. The clustering algorithm groupings included hourly television watching time (WT-H), hourly channel change (CHG-H), hourly dwell time (DWL-H), hourly median dwell time (MDWL-H), and Channel preference (PREF).

For the WT-H grouping, a 24-element tuple was assigned to each set-top box device, where each value corresponded to the average television watching time per hour in a day. In a sense, WT-H simultaneously considers the two features used in WT-D and DN-D. A value of K=3 provides a good grouping result. The three clusters covered 60%, 27%, and 13% of the set-top box devices of the second data set, respectively.

For the CHG-H grouping, a number of channel changes for each hour in a day were collected and assigned a 24-element vector to each set-top box device. For this grouping, a value of K=4 led to a good grouping result, where the clusters had 47%, 25%, 21%, and 7% of the set-top box devices of the second data set, respectively.

For the DWL-H grouping, average dwell time per channel change was calculated for each hour. A 24-element vector was assigned to each set-top box device. For this grouping, a value of K=4 led to a good grouping result, where the clusters have 37%, 31%, 24%, and 8% of the set-top box devices of the second data set, respectively.

For the MDWL-H grouping, one-hour intervals were used. The median dwell time value was calculated for each 1-hour bin and input into the K-mean algorithm. For this grouping, a value of K=4 led to a good grouping result, where the clusters have 41%, 20%, 10%, and 29% of the set-top box devices of the second data set, respectively.

For the PREF grouping, an access probability to each of the top 150 channels (which covers about 98% of channel popularity) was calculated. The channels were classified based on program content and aggregate probabilities for eight types of content (i.e., K=8). Table 4 shows the classifications.

TABLE 4

| Type | Examples | # of channels |
| --- | --- | --- |
| News | CNN, ABC, NBC | 13 |
| Kids | Disney, Cartoon Network | 15 |
| Sports | ESPN, Star games, NBA TV | 20 |
| Movies | HBO, Cinemax | 15 |
| Science | Discovery channel, Animal planet | 20 |
| Music | MCM, MTV | 21 |
| Foreign | TF1, BFM, Al Jazeera, CCTV | 18 |
| Others | TBN, EWTN | 28 |

A determination may be made whether set-top box devices in different groups exhibit different channel preferences. Mutual information may be used in measuring differences of channel preferences of set-top box devices belonging to different groups.

In probability theory and information theory, mutual information of two random variables quantitatively measures their mutual dependence. Formally, the mutual information of two discrete random variables X and Y can be defined as:

$$I(X; Y) = \sum_{y \in Y} \sum_{x \in X} p(x, y) \log\left(\frac{p(x, y)}{p_1(x) p_2(y)}\right) \qquad \text{Eqn (17)}$$

When X and Y are independent, the mutual information I(X; Y) is 0. Thus, the smaller the mutual information value is, the larger the difference between X and Y.

Significance testing may be used to determine whether the channel preference of a given set-top box device group G is significantly different from that of all set-top box devices S. For this, the mutual information $I_G$ between a channel preference vector of G and that of S is calculated using Eqn (17). Here, X and Y are two variables describing channel preferences. In particular, $p_1(x=X)$ is the probability to choose a type X channel for group G. Similarly, $p_2(x=Y)$ is a probability to choose a type Y channel for S. $p(x=X, y=Y)$ is the probability of choosing type X channel in G and choosing type Y channel in S.

A subset $S_i$ of S is randomly selected. The subset $S_i$ has the same size as group G. Similarly, the mutual information $I_{Si}$ is computed. After taking a large number of random selections of $S_i$, an empirical distribution of $I_{Si}$ can be determined. According to the Central Limit Theorem, $I_{Si}$ is approximately normally distributed with mean $\hat{\mu}$ and deviation $\hat{\delta}$. Here, a null hypothesis $H_0$ is: group G is not significantly different from S in terms of channel preferences. For the sampled distribution, the p-value $Pr[\overline{X} \leq I_G|(\hat{\mu}, \hat{\delta})]$ is computed. When the p-value is very small (e.g., <0.005), $H_0$ is rejected. Using this method, whether a group G has a significant difference in the channel preference compared with all set-top box devices S can be verified. The same method can be applied on a given type of channels to determine if G has a significant difference in preference for that type of channel.

Table 5 shows channel preferences of all set-top box devices as well as set-top box device groups based on PREF. There are eight set-top box device groups, each of which corresponds to one type of channels. The size of the set-top box device groups varies from about 45% of all the set-top box devices to about 2% of all the set-top box devices. The set-top box device group preferring news channels is the largest, and set-top box device groups preferring music and foreign channels are the smallest. The identified significant differences in channel preference are highlighted in bold. Compared to all of the set-top box devices, each group exhibits distinct preference for the corresponding type of channels. For example, group 1 shows a significant preference for news channels. These results indicate the potential benefit of modeling different groups separately.

different grouping methods, a normalized metric called symmetric uncertainty may be adopted. Symmetric uncertainty may be defined as:

$$U(X, Y) = 2 \frac{I(X; Y)}{H(X) + H(Y)} \quad \text{Eqn (18)}$$

where I(X; Y) is the mutual information defined in Equation (17) and H is the entropy:

$$H(X) = -\sum_{i=1}^{n} p(x_i) \log_b p(x_i) \quad \text{Eqn (19)}$$

When X and Y are independent, U(X, Y)=0. When X is a function of Y, U(X, Y)=1.

Table 6 shows the symmetric uncertainty between the channel preferences (i.e., PREF) and different groupings. The clustering algorithm groups based on hourly median dwell time (MDWL-H) and on hourly television watching time (WT-H) yielded the highest and lowest symmetric uncertainty values (0.513 and 0.123, respectively) among all the groupings. Intuitively, this result may be explained as follows. Users who watch television at the same time during a day do not necessarily watch the same set of channels (i.e., they do not necessarily have a clear mutual interest in channels). However, users who switch channels at the same time during a day may

TABLE 5

| | News | Kids | Sports | Movies | Science | Music | Foreign | Others | Group Size |
|---|---|---|---|---|---|---|---|---|---|
| All (%) | 52.3 | 14.4 | 5.2 | 3.1 | 1.8 | 0.3 | 0.4 | 22.4 | 100 |
| Group1 (%) | 67.8 | 9.7 | 3.5 | 2.1 | 1.2 | 0.2 | 0.3 | 15.2 | 45 |
| Group2 (%) | 49.5 | 19.0 | 4.9 | 2.9 | 1.7 | 0.3 | 0.4 | 21.2 | 12 |
| Group3 (%) | 50.2 | 13.8 | 9.0 | 3.0 | 1.7 | 0.3 | 0.4 | 21.5 | 5 |
| Group4 (%) | 50.7 | 14.0 | 5.1 | 6.0 | 1.8 | 0.3 | 0.4 | 21.8 | 6 |
| Group5 (%) | 50.6 | 13.9 | 5.0 | 3.9 | 5.1 | 0.3 | 0.4 | 21.7 | 3 |
| Group6 (%) | 51.0 | 14.8 | 5.1 | 3.0 | 1.8 | 3.0 | 0.4 | 21.8 | 2 |
| Group7 (%) | 51.6 | 14.2 | 5.1 | 3.0 | 1.9 | 0.3 | 1.8 | 22.1 | 2 |
| Group8 (%) | 48.9 | 13.5 | 4.9 | 2.9 | 1.7 | 0.3 | 0.4 | 27.5 | 27 |

A "good" grouping should yield set-top box device groups that well represent the channel preferences and should be stable over time. To identify grouping methods that yield a good representation of channel preferences of set-top box devices, mutual information between set-top box device groups based on PREF and those based on each of other grouping methods (denoted as M) may be calculated using Eqn (17). Each set-top box device group may be considered as a random variable. $p_1(x=X)$ is the probability that a set-top box device belongs to group X according to PREF. $p_2(y=Y)$ is the probability that a set-top box device belongs to group Y according to a given grouping method M. The joint distribution p(x=X, y=Y) is the probability that a set-top box device belongs to group X based on PREF and belongs to group Y based on M.

Different grouping methods may yield different numbers of groupings. For example, the location based grouping will yield over 150 clusters based on the second data set while other grouping methods may yield a handful of groups. In such a case, the mutual information I(X; Y) defined in Eqn. (17) may be misleading. To perform a fair comparison on have a strong preference for the type of channels they watch. This is because most of the channel change behaviors are impacted by the start/end times and commercial breaks of the television program. The symmetric uncertainty values for threshold based grouping methods range from 0.179 to 0.314, with the grouping based on the daily watching time WT-D having the highest value and grouping based on the location LC having the lowest value.

TABLE 6

| | PREF |
|---|---|
| WT-D | 0.314 |
| DN-D | 0.305 |
| CHG-D | 0.254 |
| DWL | 0.309 |
| LC | 0.179 |
| WT-H | 0.123 |
| CHG-H | 0.206 |
| DWL-H | 0.430 |
| MDWL-H | 0.513 |

A grouping method should yield groups that are stable over time. A stability test on the groupings may be performed. The percentage of set-top box devices that stay in the same group over a certain time period (e.g., 15 days) may be used as a metric to measure the stability of set-top box device groups.

significance testing, the heavy-watchers group and light-watchers group have distinct preferences to news and kids channels.

TABLE 8

|  | News | Kids | Sports | Movies | Science | Music | Foreign | Others | Group Size |
|---|---|---|---|---|---|---|---|---|---|
| All watchers (%) | 52.3 | 14.4 | 5.2 | 3.1 | 1.8 | 0.3 | 0.4 | 22.4 | 100 |
| Heavy-watchers (%) | 62.6 | 9.7 | 4.9 | 2.3 | 2.0 | 0.4 | 0.3 | 19.6 | 28 |
| Light-watchers (%) | 47.4 | 17.5 | 5.4 | 2.3 | 1.7 | 0.4 | 0.4 | 25.3 | 36 |
| Medium-watchers (%) | 53.3 | 13.9 | 4.7 | 3.0 | 1.9 | 0.3 | 0.3 | 22.5 | 36 |

The second set of data was divided into two 15 day sets. Set-top box device groupings were computed on each 15-day set of data separately and examined to determine the stability of the groupings. For clustering algorithm based grouping methods, because the group centers are determined non-deterministically, the second 15-day set is grouped by using the same group centers as those that are identified in the first 15-day set. For a given set-top box device in the second 15-day trace, the distance between its channel preference vector obtained in the second 15-day set and each group center identified in the first 15-day set was computed. The set-top box device was assigned to the group of which the center was closest.

Table 7 shows the stability of different grouping methods. The grouping based on channel preference PREF is not stable over time. This indicates that PREF may not be a good grouping method to be used in the model even though Table 5 shows PREF represents distinct channel preferences in each set-top box device group.

TABLE 7

| PREF | 67.1% |
|---|---|
| WT-D | 83.5% |
| DN-D | 79.4% |
| CHG-D | 77.6% |
| DWL | 74.3% |
| LC | 100% |
| WT-H | 70.4% |
| CHG-H | 72.3% |
| DWL-H | 66.5% |
| MDWL-H | 69.4% |

All the grouping methods based on hourly features (i.e., WT-H, CHG-H, DWL-H, and MDWL-H) have low stability over time. Hence, they may not be considered good grouping methods to be used in the model.

Groupings based on location LC yields perfect stability of set-top box device groups. This is expected because set-top box devices location is less likely to change over time. However, since LC has a low symmetric certainty value as shown in Table 6 it may not be considered a good choice for the model.

The grouping based on daily television watching time WT-D has the highest stability among all grouping methods other than LC. In addition, WT-D also has a relative high value in symmetric uncertainty as shown in Table 6 (it is the highest among the threshold based grouping methods). Thus, WT-D may be the best grouping method identified based on the second set of data. In the following, WT-D is used as the grouping method to illustrate results.

Table 8 compares the channel preference of each group based on WT-D with that of all set-top box devices. Based on The grouping WT-D may be used to improve the performance of a model of channel popularity dynamics. WT-D was chosen because of the high stability over time and the reasonably large symmetric uncertainty value. Other groupings may also be used. Using $X_{ij}^t$, $\mu_{ij}$, $\lambda_{ij}$ and $\sigma_{ij}$ to denote the popularity measure, the long-term mean, the mean reversion rate and the volatility of the group j on the channel i, respectively, the estimation procedures described above may be adapted to derive the parameters for every (channel, group) combination.

To simulate the temporal popularity dynamics for a channel c, all (c, j), j=1, 2, . . . , may be mixed using the empirical population proportion for each group as the mixture weight. This may be expressed as the multi-class model:

$$X_i^t = \sum_j W_{ij}^t \times X_{ij}^t \qquad \text{Eqn (20)}$$

where $x_i^t$ denotes the popularity of channel i at time t and $W_{ij}^t$ denotes the proportion of set-top box devices in group j watching the channel i at time t.

Figure 31:
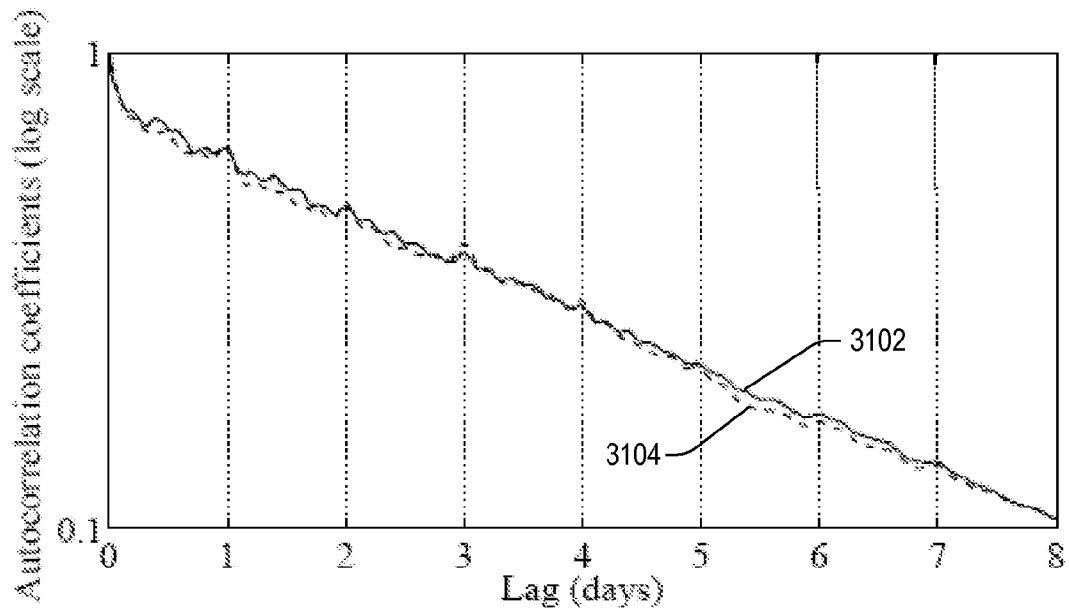
FIG. 31 depicts a comparison of the autocorrelation function determined from data with the autocorrelation function determined by a mean reversion process multiple-class model.

To evaluate the multi-class model of Eqn. (20), the multi-class model is used to simulate the process of the popularity dynamics. The results are compared to real traces derived from real data of the second data set. As shown in FIG. 29, the single class model may not model the daily bumps on the autocorrelation curve well. The multi-class model is able to model the daily bumps at the day boundaries on the autocorrelation curve, as seen in FIG. 31. Real trace 3102 shows data obtained from the second set of data. Curve 3104 shows data obtained from the multi-class model of Eqn. (20). The mean square error of the multi-class model (MSE=1.6×10$^{-5}$) is more than one order of magnitude smaller than the mean square error of the single-class model (MSE=2.4×10$^{-4}$).

Figure 32:
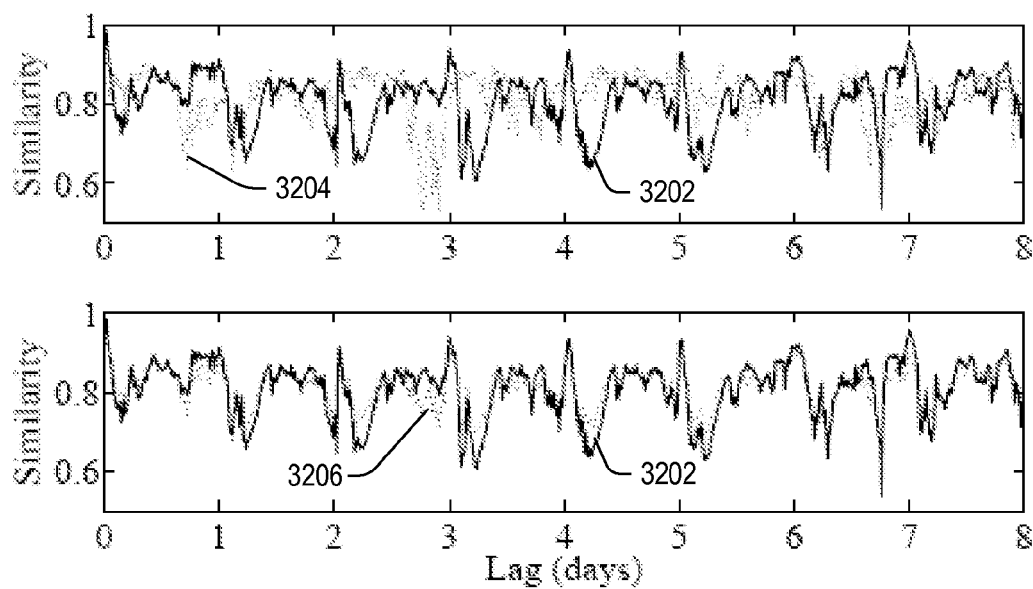
FIG. 32 depicts cosine similarity functions when varying lag. The upper graph depicts results for the single-class model. The lower graph depicts results for the multiple-class model.

Given a fixed lag, the cosine similarity between the channel popularity vectors of two adjacent 15 minute-time-bins are computed and the average is taken. FIG. 32 depicts a comparison of the cosine similarities for the single class model and the multi-class model. Real trace 3202 depicts a trace obtained from the second set of data. Curve 3204 depicts the result of the single class model, and curve 3206 depicts the result of the multi-class model. The multiclass model captures the high daily similarity better than the single class model. The mean square error of the multi-class model (MSE=10$^{-3}$) is about one order of magnitude smaller than the mean square error of the single-class model (MSE=9×10$^{-3}$). By taking advantage of a good grouping feature with high stability and symmetric uncertainty scores, the multi-class model can generate a more accurate temporal dynamics process to simulate a real scenario than can a single-class model.

For simplicity, the design of the workload generator, referred to as the Simulwatch model, is first described based on the single-class population model. Then, the extension to a multi-class population model is presented.

Figure 33:
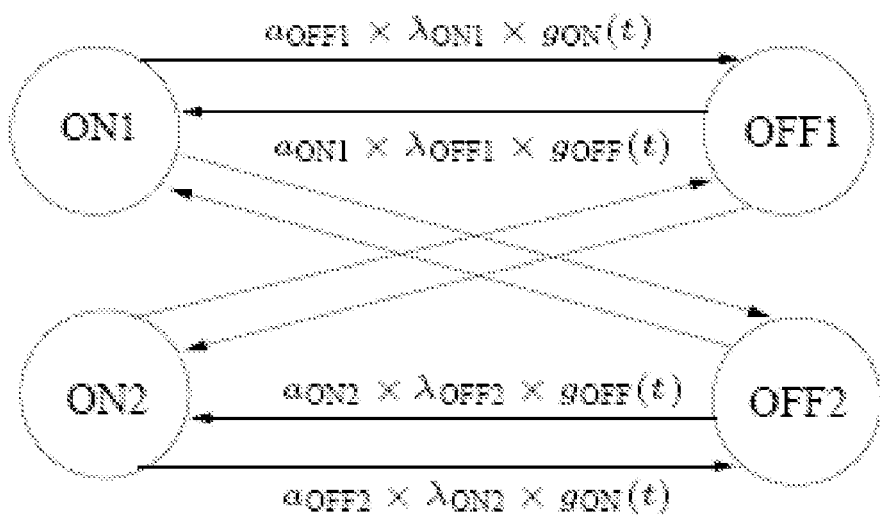
FIG. 33 depicts a visual representation of an ON-OFF model.

In the single-class population model, switching-on and switching-off events matching both on-session and off-session length distributions and the aggregate event rates are to be generated. A closed-population ON-OFF model where both ON and OFF states include several sub-states is defined. Each of the sub-states may correspond to a mixture exponential distribution. FIG. 33 illustrates the structure of the ON-OFF model with 2 sub-states in each of the ON and OFF states. The transition rate from $ON_i$ to $OFF_j$ state is:

$$a_{OFF,j} \times \lambda_{ON,i} \times g_{ON}(t) \quad \text{Eqn (21)}$$

and similarly the reverse direction rate from $OFF_j$ to $ON_i$ is $$a_{ON,i} \times \lambda_{OFF,j} \times g_{OFF}(t) \quad \text{Eqn (22)}$$

To drive the event simulation, assuming a set-top box device arrives at state $ON_i$ at time t, the edge of the next transition can be determined using the branching probabilities $a_{OFF,j}$. The time of the next transition, t+x, may be determined using the probability density function:

$$\phi_{ON,i}(x;t) = \lambda_{ON,i} \times g_{ON}(t+x) \times e^{-\lambda_{ON,i} \int_t^{t+x} g_{ON}(y) dy} \quad \text{Eqn (23)}$$

The timing of channel-switch events can be determined in the same fashion as those of switching-on or switching-off events. The event generation for a next channel-switch event may be triggered not only at the time of the previous channel-switch, but also when a new switching-on event takes place. Also, a pending channel-switch event may be cancelled when a switching-off event from the same set-top box device takes place first.

To determine which channel to switch to, the last channel watched was tracked for each set-top box device. At the time of a scheduled channel-switch event, assuming the last channel watched was i with popularity rank $r_i$, the probability that the next channel was j with rank $r_j$ was computed as follows:

$$\text{Probability} = \begin{cases} (1-p_t)p_u + p_t f_0(r_j) & j = i+1 \\ (1-p_t)(1-p_u) + p_t f_0(r_j) & j = i-1 \\ p_t f_0(r_j) & |i-j| > 1 \end{cases} \quad \text{Eqn (24)}$$

Eqn (24) is the Simulwatch model as a single-class model. The single-class model may be extended to a multi-class model. Assuming N groups are obtained and each group includes a fixed proportion, $p_i$, i=1, 2, ..., N, of all set-top box devices, where $\Sigma_{i=1}^{N} p_i = 1$. For each set-top box device, a determination may be made of which group the set-top box device belongs to based on the probabilities. In each group, the workload is generated using the same method as used in the single-class population model with the proper parameters. To generate the modeled traffic to mimic the dynamics of channel popularity, a mapping between channel identification and popularity rank within each group may be determined and the channel popularity may be calculated by combining the results from all the groups.

Estimates of user activity generated by the Simulwatch model were evaluated to determine whether the Simulwatch model mimics real user activities. Estimated user activity and traces based on real data were compared for (i) properties explicitly modeled, such as session length distribution, aggregate event rate, and channel popularity distribution, (ii) properties not explicitly model like channel popularity dynamics and numbers of on-line set-top box devices, and (iii) a case study on estimating the bandwidth consumed by simultaneous unicast streams and concurrent multicast channels at different times for use in rapid channel changing.

Estimates of user activity were generated for two millions set-top box devices and 700 channels based on model parameters presented above. Each set-top box device started from a random state at time 0, and the initial part of the output was discarded until the system reaches a steady state. On a personal computer with a 2.4 GHz central processing unit and 4 GB of memory, about 5 hours was needed to generate one-day worth of estimated results. The estimated results were compared to real trace data obtained from data collected on a different day than the dates used to obtain the model parameters. Since the single-class population based workload generator worked reasonably well for many properties, data generated by the single-class population model was used for simplicity unless specified otherwise. Data generated by the multi-class population model was used when illustrating the capability to capture the dynamics of channel popularity.

Figure 34:
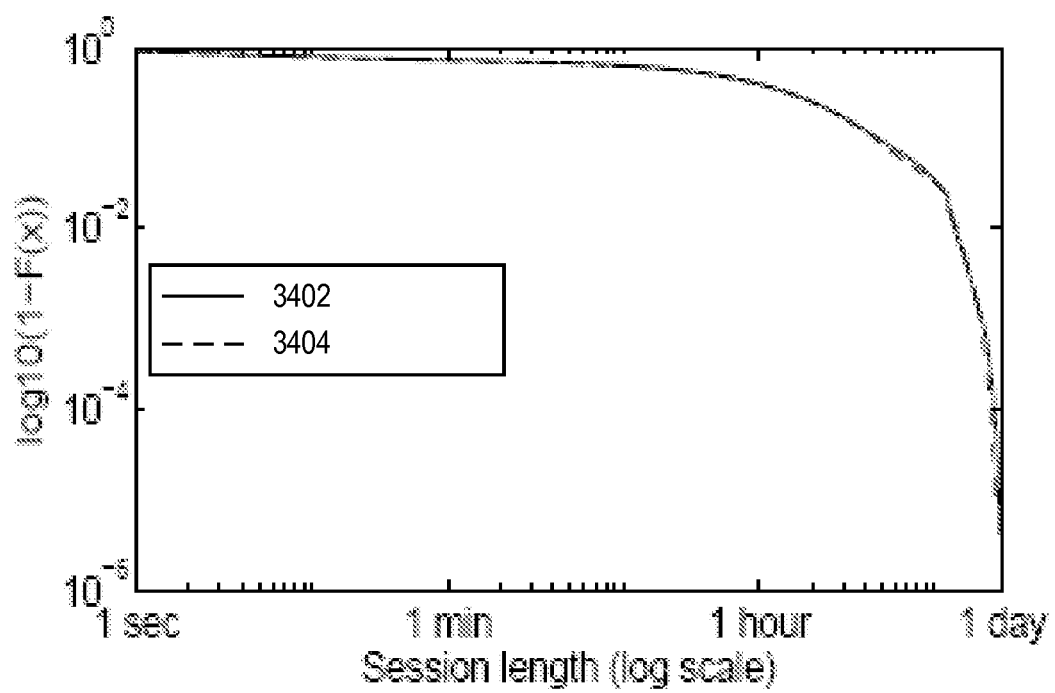
FIG. 34 depicts a comparison of session-length distribution for on-sessions.

FIG. 34 shows session-length distribution for on-sessions. An exceptionally good match between real trace 3402 and estimated user activity 3404 is apparent by visual inspection. Similar results were obtained for session-length distributions for off-sessions and channel sessions. To qualitatively measure the closeness of two distributions, a chi-square goodness-of-fit was computed. In the chi-square goodness-of-fit computation, the data was divided into m bins and tested via the equation:

$$\chi^2 = \sum_{i=1}^{m} (O_i - E_i)^2 / E_i \quad \text{Eqn (25)}$$

where $O_i$ is the observed frequency for bin i (generated by the model) and $E_i$ is the expected frequency for bin i (collected from the real trace). The smaller the value of $\chi^2$ is, the better the model and trace match. Whether observation O can be considered as arising from the same distribution as E may be tested. The test is represented through associated one-sided chi-square P-value $P(\chi^2)$. This represents the proportion of the time that a value of $\chi^2$ or greater would be obtained if O and E were drawn from the same distribution. For a hypothesis testing at significant level $P_0$, the null hypothesis (O and E are from the same distribution) may be rejected when $P(\chi^2) < P_0$.

Table 9 shows the goodness-of-fit for session length distribution when the bin size is 1 minute. Using a common significant level $P_0=5\%$, in all cases the two session length distributions (synthetic trace and real trace) are statistically the same. In addition, the multi-class population model yielded smaller goodness-of-fit score, indicating that the multi-class population model may fit the real trace better than the single-class population model.

TABLE 9

| Model | Goodness-of-fit for session length distribution | | | Channel Popularity |
|---|---|---|---|---|
| | ON | OFF | Channel | |
| Single-class | 0.147 | 0.132 | 0.132 | 0.083 |
| Multi-class | 0.099 | 0.089 | 0.091 | 0.068 |

Figure 35:
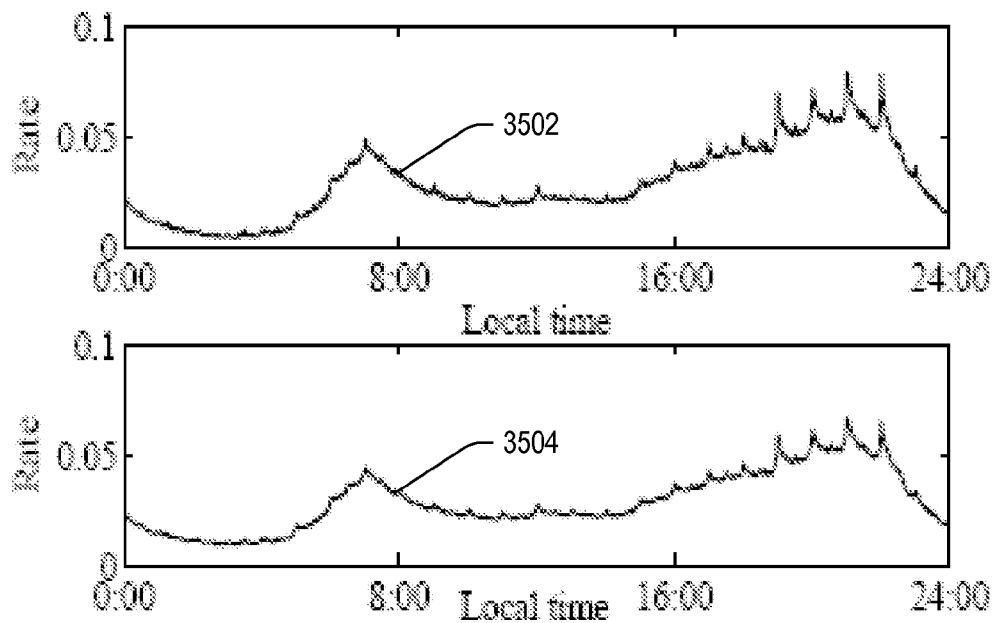
FIG. 35 depicts a comparison of aggregate event rates for on-sessions.

FIG. 35 depicts the aggregate event rate for on-sessions. A relatively good match between real trace 3502 and the estimated user activity 3504 is apparent by visual inspection. Similar results were obtained for session-length distributions for off-sessions and channel sessions. Table 10 shows the root mean square error (RMSE) between the model and real trace when modeling the time-varying rate. The RMSE of the multi-class population model was about an order of magnitude smaller than that of the single-class population model for the switch-on model, the switch-off model, and the channel-switch model. The reduction in RMSE may be due to the multi-class population models using triple the number of parameters than the corresponding single-class population models, which implies that more details have been modeled. The added precision of the multi-class model may not be needed for many applications of the user activity data.

TABLE 10

| Model | Switch-on | Switch-off | Channel-switch |
| --- | --- | --- | --- |
| Single-class | 2.3e−3 | 2.4e−3 | 2.5e−3 |
| Multi-class | 1.8e−4 | 1.9e−4 | 2.4e−4 |

Figure 36:
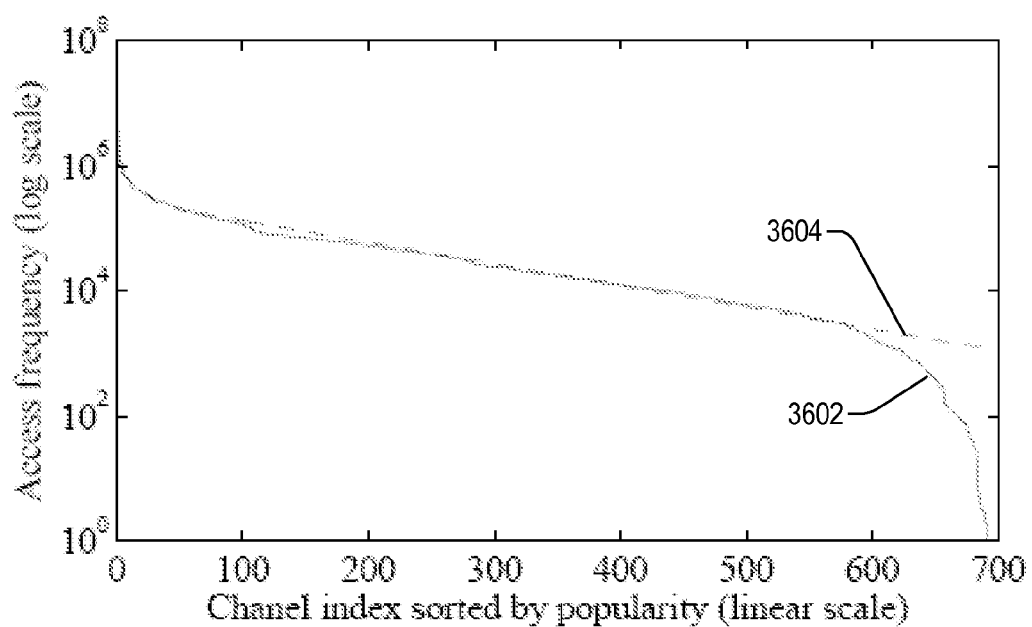
FIG. 36 depicts channel popularity distributions for a real trace and model generated user activity information.

FIG. 36 depicts channel popularity distributions for both a real trace 3602 and estimated user activity information 3604. The popularity of the top 600 channels matches very well. Table 9 shows the goodness-of-fit for channel popularity distribution when the bin size is 1 channel. The multi-class population model yielded a smaller goodness-of-fit score, indicating that multi-class population model can fit the real trace better than the single-class population model.

Figure 37:
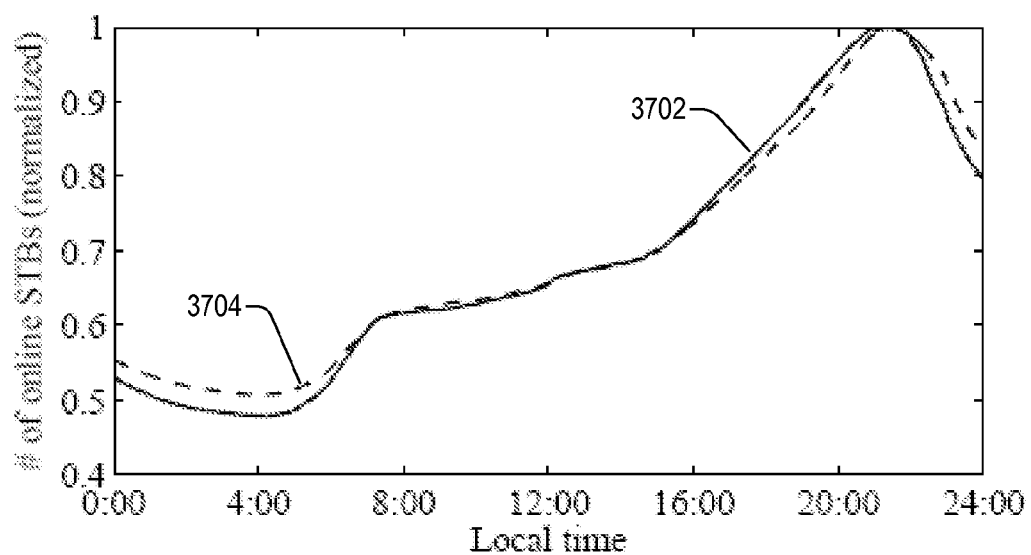
FIG. 37 depicts the number of on-line set-top box devices over time.

FIG. 37 shows the average number of on-line set-top box devices as a function of the time-of-day. Both real trace 3702 and estimated user activity information 3704 are normalized so that the value at their peak time is 1. Average number of on-line set-top box devices was not a property that was modeled directly, still there was a good match in the shapes of the estimated user activity information 3704 and the real trace 3702.

Figure 38:
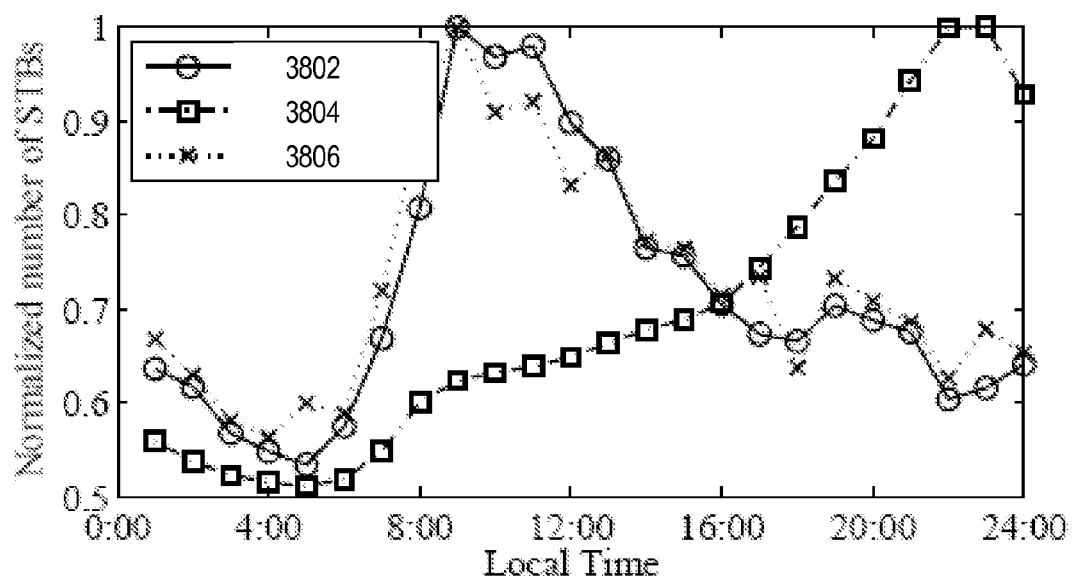
FIG. 38 depicts a comparison of a real trace to estimated user activity information from a single-class model and estimated user activity information from a multi-class model.

The channel popularity distribution may change over time within a single day. A real trace of change in popularity of a child content channel is depicted as real trace 3802 in FIG. 38. The change is normalized such that the maximum value is 1. Curve 3804 depicts the estimated user activity using the single-class population model. Curve 3806 depicts the estimated user activity using the multi-class population model. The curve 3804 for the single-class population model does not capture the dynamics of channel popularity very well. The curve 3804 for the single-class population model is similar to the curve of online set-top box devices over time in FIG. 37 because the single-class population model treats every channel-switch event uniformly; and therefore, the changing rate of channel popularity is proportional to the changing rate of on-line set-top box device population. The curve 3806 for the multi-class population model shows that the multi-class population model captured the dynamics of channel popularity.

Two factors may shape the popularity dynamics of a particular channel: i) the channel access transition probability defined as the number of set-top box devices in a particular population (for multi-class population model) watching that channel divided by the number of online set-top box devices in that population at that time period (e.g., one hour) and ii) the population mix which includes the proportions of different subgroups in the whole user population. The channel popularity dynamics may be generated by the combinational effect (which can be viewed as the weighted sum of productions of subgroups) of these two factors.

Figure 39:
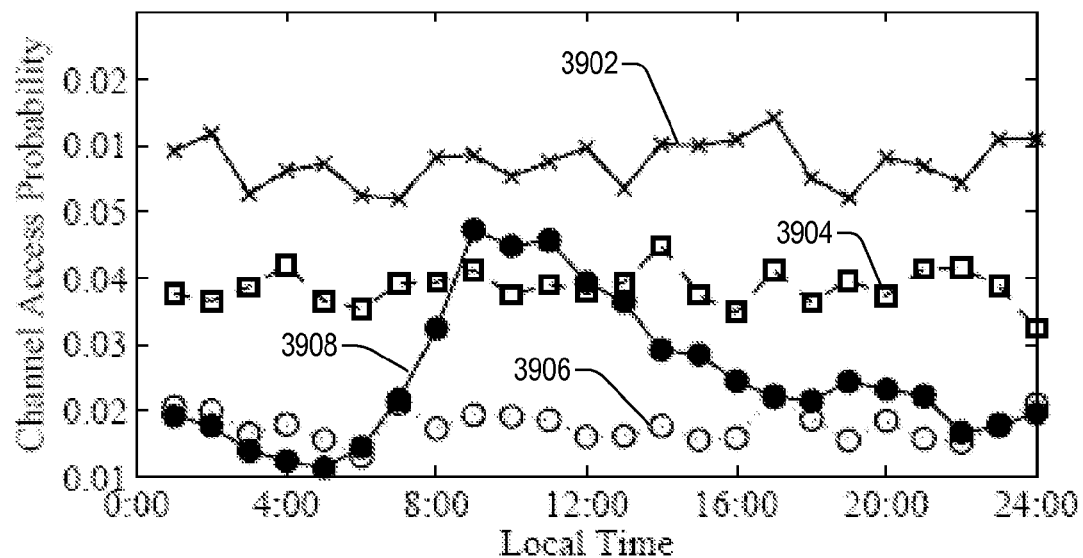
FIG. 39 depicts time-of-day dynamics for a popular child content channel based on a multi-class model.
Figure 40:
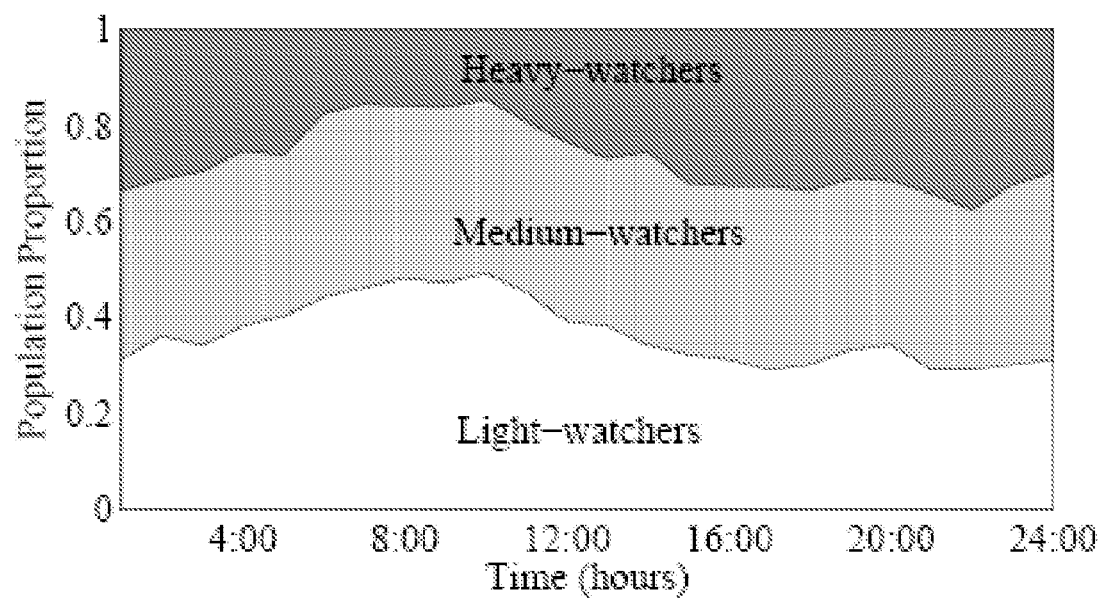
FIG. 40 depicts population mix for each type of group.

FIG. 39 shows the channel access probability of a popular children content channel from the multi-class population model estimated user activity. Curve 3902 represents user activity information for light-watchers, curve 3904 represents user activity information for medium-watchers, curve 3906 represents user activity information for heavy-watchers, and curve 3908 represents user activity information for all of the watchers. The curve 3908 for all of the watchers shows a diurnal pattern, but all the other curves are quite stable. The change of the channel access probability in each group is very small and does not appear to contribute to the dynamics of channel popularity in FIG. 38. FIG. 40 illustrates the population mix used in the generation of the user activity information for each of the groups. The light-watcher group includes the majority of watchers for children content channels. Comparing FIG. 39 with FIG. 40, it appears that the increase bump at approximately times 5:00-14:00 of the light-watcher group in the population mix contributes to the spike seen in FIG. 38.

Estimated user activity produced by the Simulwatch model may be used in evaluating the performance of different IPTV system designs, different system parameter settings, and other information. In one embodiment, the Simulwatch model may be used to determine unicast and multicast requirements of an IPTV system used to facilitate rapid channel changes for users of the IPTV system. To implement rapid channel changes, a short (x seconds) unicast stream is transmitted to the set-top box device making a channel change in addition to a new multicast stream. The unicast stream is used to quickly fill a buffer of the set-top box device and to allow the selected channel to be sent to a display device. A single router in a video head end of the IPTV network was simulated. The router connected to 2,137 downstream set-top box devices. Different values of x (e.g., 4, 8, 16, and 32) were evaluated. The results for x=32 seconds are presented. The results for other values of x were qualitatively similar.

Figure 41:
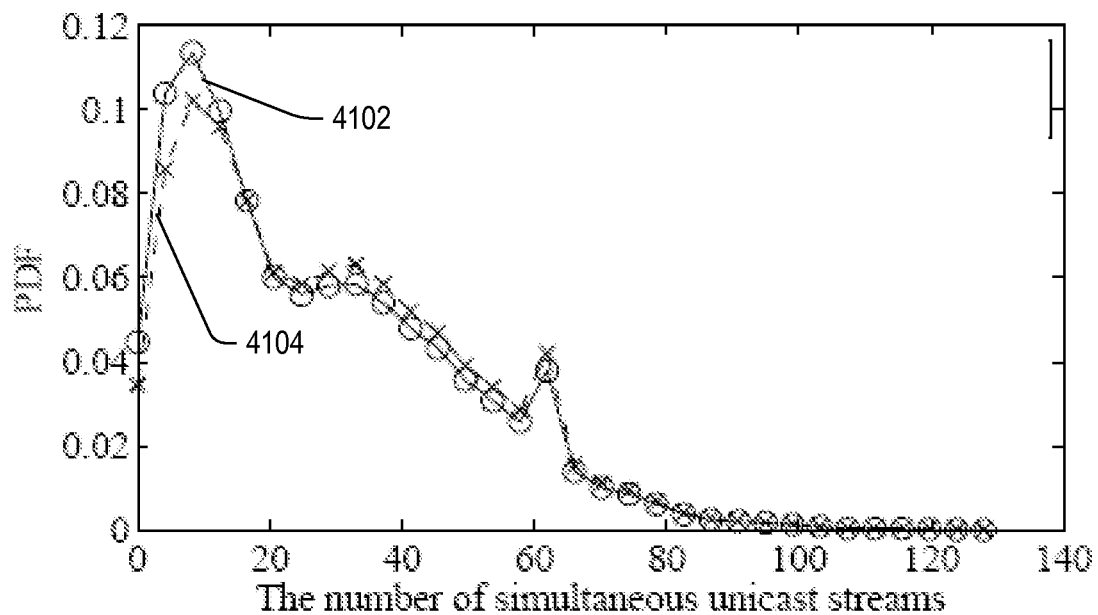
FIG. 41 depicts a probability density function of simultaneous unicast for rapid channel changing.

FIG. 41 shows the distribution density function on the number of concurrent unicast streams for real trace 4102 obtained from the first data set and for estimated user activity 4104 obtained from a single-class model. The two curves closely match. Both curves show that for around 4% of time there is no unicast stream in the system. There is a small probability that there can be demand for more than 80 concurrent unicast streams, with a maximum demand of about 128 concurrent unicast streams. There are two local peaks (at 10 and 60) in both distribution functions 4102, 4104. The second of which may relate to the correlated channel switchings at hour boundaries. This result demonstrates that the Simulwatch model may preserve the intrinsic characteristics of user activities. In an embodiment, the results produced by the Simulwatch model may allow an operator of an IPTV system to reduce the value of x for the IPTV system from a first value (e.g., 32) to a second value (e.g., 8).

Figure 42:
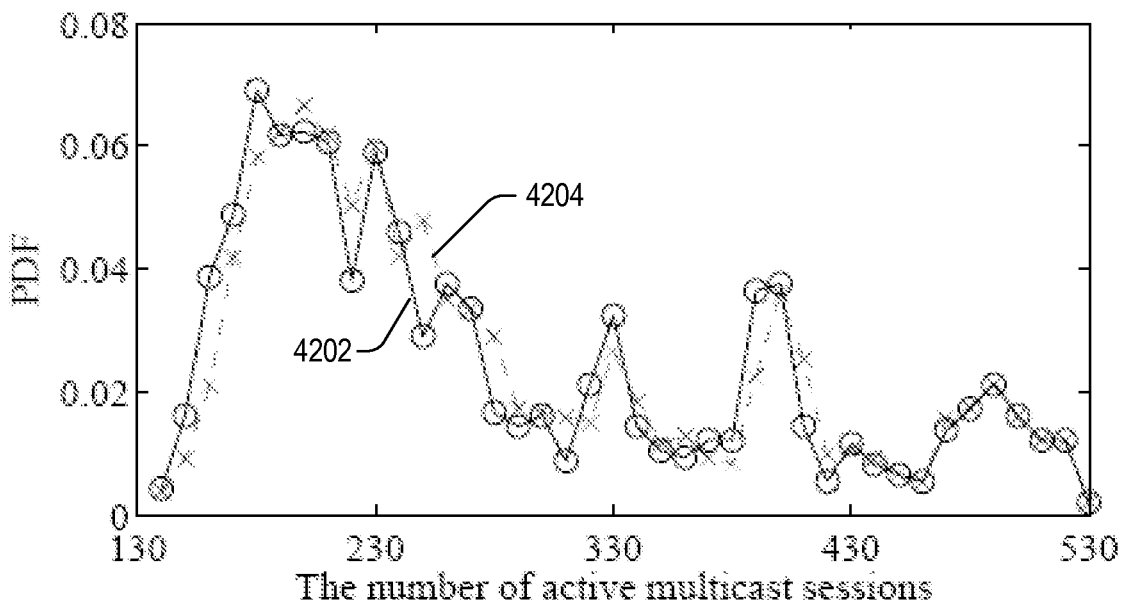
FIG. 42 depicts a probability density function of active multicast channel count.

The number of channels that these 2,137 set-top box devices collectively request was also examined. This value translates to the amount of multicast traffic involved to support live television viewing for the users. In FIG. 42, curve 4202 is a real trace, and curve 4204 is a probability density function for the number of channels from a single-class population model. The results of curve 4204 closely match the real trace curve 4202.

The Simulwatch model may accurately capture a number of user activities including length of on-sessions, length of off-sessions, and channel popularity. The channel popularity may be helpful in workload characterization and performance evaluation of network systems. The Simulwatch model may use a relatively small number of parameters to model user activities. The Simulwatch model may be used to facilitate design of new network systems for installation. The Simulwatch model may be used to facilitate design of new systems to be added to existing network systems. The estimated user activity information generated by the Simulwatch model may be used in performance studies of existing IPTV systems. For example, the Simulwatch model may be used to accurately estimate the unicast and multicast IPTV traffic bandwidth for implementing fast channel changing based on results of the Simulwatch model for a number of users.

Figure 43:
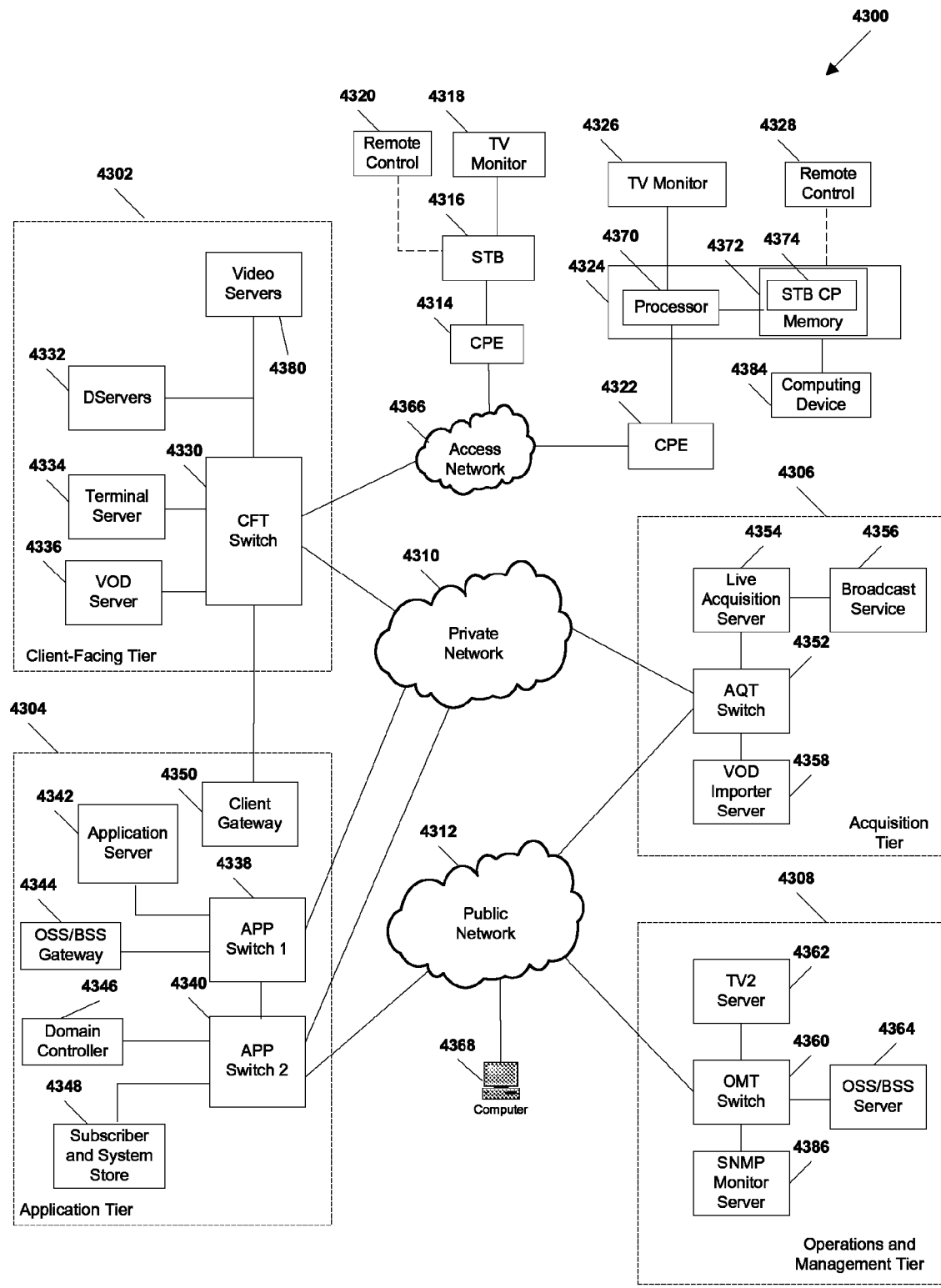
FIG. 43 is a block diagram of an illustrative embodiment of an Internet Protocol Television system.

Referring to FIG. 43, an illustrative embodiment of an Internet Protocol Television (IPTV) system is illustrated and is generally designated 4300. As shown, the system 4300 can include a client facing tier 4302, an application tier 4304, an acquisition tier 4306, and an operations and management tier 4308. Each tier 4302, 4304, 4306, 4308 is coupled to a private network 4310; to a public network 4312, such as the Internet; or to both the private network 4310 and the public network 4312. For example, the client-facing tier 4302 can be coupled to the private network 4310. Further, the application tier 4304 can be coupled to the private network 4310 and to the public network 4312. The acquisition tier 4306 can also be coupled to the private network 4310 and to the public network 4312. Additionally, the operations and management tier 4308 can be coupled to the public network 4312.

As illustrated in FIG. 43, the various tiers 4302, 4304, 4306, 4308 communicate with each other via the private network 4310 and the public network 4312. For instance, the client-facing tier 4302 can communicate with the application tier 4304 and the acquisition tier 4306 via the private network 4310. The application tier 4304 can communicate with the acquisition tier 4306 via the private network 4310. Further, the application tier 4304 can communicate with the acquisition tier 4306 and the operations and management tier 4308 via the public network 4312. Moreover, the acquisition tier 4306 can communicate with the operations and management tier 4308 via the public network 4312. In a particular embodiment, elements of the application tier 4304, including, but not limited to, a client gateway 4350, can communicate directly with the client-facing tier 4302.

The client-facing tier 4302 can communicate with user equipment via an access network 4366, such as an Internet Protocol Television (IPTV) access network. In an illustrative embodiment, customer premises equipment (CPE) 4314, 4322 can be coupled to a local switch, router, or other device of the access network 4366. The client-facing tier 4302 can communicate with a first representative set-top box device 4316 at a first customer premise via the first CPE 4314 and with a second representative set-top box device 4324 at a second customer premise via the second CPE 4322. The CPE 4314, 4322 can include routers, local area network devices, modems, such as digital subscriber line (DSL) modems, any other suitable devices for facilitating communication between a set-top box device and the access network 4366, or any combination thereof.

In a particular embodiment, the client-facing tier 4302 can be coupled to the CPE 4314, 4322 via fiber optic cables. Alternatively, the CPE 4314, 4322 can be digital subscriber line (DSL) modems that are coupled to one or more network nodes via twisted pairs, and the client-facing tier 4302 can be coupled to the network nodes via fiber-optic cables. Each set-top box device 4316, 4324 can process data received via the access network 4366, via an IPTV software platform, such as Microsoft® TV IPTV Edition.

The first set-top box device 4316 can be coupled to a first external display device, such as a first television monitor 4318, and the second set-top box device 4324 can be coupled to a second external display device, such as a second television monitor 4326. Moreover, the first set-top box device 4316 can communicate with a first remote control 4320, and the second set-top box device 4324 can communicate with a second remote control 4328. The set-top box devices 4316, 4324 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an exemplary, non-limiting embodiment, each set-top box device 4316, 4324 can receive data, video, or any combination thereof, from the client-facing tier 4302 via the access network 4366 and render or display the data, video, or any combination thereof, at the display device 4318, 4326 to which it is coupled. In an illustrative embodiment, the set-top box devices 4316, 4324 can include tuners that receive and decode television programming signals or packet streams for transmission to the display devices 4318, 4326. Further, the set-top box devices 4316, 4324 can include a STB processor 4370 and a STB memory device 4372 that is accessible to the STB processor 4370. In one embodiment, a computer program, such as the STB computer program 4374, can be embedded within the STB memory device 4372. In another illustrative embodiment, a user computing device 4384, such as a personal computer, laptop or local server, can be coupled to a set-top box device, such as the first representative set-top box device 4324, for example, via a universal serial bus (USB) connection or other connection.

In an illustrative embodiment, the client-facing tier 4302 can include a client-facing tier (CFT) switch 4330 that manages communication between the client-facing tier 4302 and the access network 4366 and between the client-facing tier 4302 and the private network 4310. As illustrated, the CFT switch 4330 is coupled to one or more data servers, such as D-servers 4332, that store, format, encode, replicate, or otherwise manipulate or prepare video content for communication from the client-facing tier 4302 to the set-top box devices 4316, 4324. The CFT switch 4330 can also be coupled to a terminal server 4334 that provides terminal devices with a connection point to the private network 4310. In a particular embodiment, the CFT switch 4330 can be coupled to a video-on-demand (VOD) server 4336 that stores or provides VOD content imported by the IPTV system 4300.

Further, the CFT switch 4330 is coupled to one or more video servers 4380 that receive video content and transmit the content to the set-top boxes 4316, 4324 via the access network 4366. In a particular embodiment, the CFT switch 4330 can be coupled to one or more publication servers that facilitate the formation of groups that share private content and the inclusion of indicators of such private content with video content received by users in a group.

In an illustrative embodiment, the client-facing tier 4302 can communicate with a large number of set-top boxes, such as the representative set-top boxes 4316, 4324 over a wide geographic area, such as a regional area, a metropolitan area, a viewing area, a designated market area or any other suitable geographic area, market area, or subscriber or customer group that can be supported by networking the client-facing tier 4302 to numerous set-top box devices. In a particular embodiment, the CFT switch 4330, or any portion thereof, can include a multicast router or switch that feeds one or more video streams from a video server to multiple set-top box devices. The Simulwatch model may be used to provide estimated user activity information for set-top boxes when modeling the IPTV system 4300, instead of using user activity information obtained from the set-top box devices 4316, 4324 of the IPTV system 4300.

As illustrated in FIG. 43, the application tier 4304 can communicate with both the private network 4310 and the public network 4312. The application tier 4304 can include a first application tier (APP) switch 4338 and a second APP switch 4340. In a particular embodiment, the first APP switch 4338 can be coupled to the second APP switch 4340. The first APP switch 4338 can be coupled to an application server 4342 and to an OSS/BSS gateway 4344. In a particular embodiment, the application server 4342 can provide applications to the set-top box devices 4316, 4324 via the access network 4366, which enable the set-top box devices 4316, 4324 to provide functions, such as display, messaging, processing of IPTV data and VOD material, etc. In a particular embodiment, the OSS/BSS gateway 4344 includes operation systems and support (OSS) data, as well as billing systems and support (BSS) data. In one embodiment, the OSS/BSS gateway 4344 can provide or restrict access to an OSS/BSS server 4364 that stores operations and billing systems data.

The second APP switch 4340 can be coupled to a domain controller 4346 that provides Internet access, for example, to users at their computers 4368 via the public network 4312. For example, the domain controller 4346 can provide remote Internet access to IPTV account information, e-mail, personalized Internet services, or other online services via the public network 4312. In addition, the second APP switch 4340 can be coupled to a subscriber and system store 4348 that includes account information, such as account information that is associated with users who access the IPTV system 4300 via the private network 4310 or the public network 4312. In an illustrative embodiment, the subscriber and system store 4348 can store subscriber or customer data and create subscriber or customer profiles that are associated with IP addresses of corresponding set-top box devices 4316, 4324.

In a particular embodiment, the application tier 4304 can include a client gateway 4350 that communicates data directly to the client-facing tier 4302. In this embodiment, the client gateway 4350 can be coupled directly to the CFT switch 4330. The client gateway 4350 can provide user access to the private network 4310 and the tiers coupled thereto. In an illustrative embodiment, the set-top box devices 4316, 4324 can access the IPTV system 4300 via the access network 4366, using info nation received from the client gateway 4350. User devices can access the client gateway 4350 via the access network 4366, and the client gateway 4350 can allow such devices to access the private network 4310 once the devices are authenticated or verified. Similarly, the client gateway 4350 can prevent unauthorized devices, such as hacker computers or stolen set-top box devices from accessing the private network 4310, by denying access to these devices beyond the access network 4366.

For example, when the first representative set-top box device 4316 accesses the client-facing tier 4302 via the access network 4366, the client gateway 4350 can verify subscriber information by communicating with the subscriber and system store 4348 via the private network 4310. Further, the client gateway 4350 can verify billing information and status by communicating with the OSS/BSS gateway 4344 via the private network 4310. In one embodiment, the OSS/BSS gateway 4344 can transmit a query via the public network 4312 to the OSS/BSS server 4364. After the client gateway 4350 confirms subscriber and/or billing information, the client gateway 4350 can allow the set-top box device 4316 to access IPTV content and VOD content at the client-facing tier 4302. If the client gateway 4350 cannot verify subscriber information for the set-top box device 4316, e.g., because it is connected to an unauthorized twisted pair, the client gateway 4350 can block transmissions to and from the set-top box device 4316 beyond the access network 4366.

As indicated in FIG. 43, the acquisition tier 4306 includes an acquisition tier (AQT) switch 4352 that communicates with the private network 4310. The AQT switch 4352 can also communicate with the operations and management tier 4308 via the public network 4312. In a particular embodiment, the AQT switch 4352 can be coupled to a live acquisition server 4354 that receives or acquires television content, movie content, advertisement content, other video content, or any combination thereof, from a broadcast service 4356, such as a satellite acquisition system or satellite head-end office. In a particular embodiment, the live acquisition server 4354 can transmit content to the AQT switch 4352, and the AQT switch 4352 can transmit the content to the CFT switch 4330 via the private network 4310.

In an illustrative embodiment, content can be transmitted to the D-servers 4332, where it can be encoded, formatted, stored, replicated, or otherwise manipulated and prepared for communication from the video server(s) 4380 to the set-top box devices 4316, 4324. The CFT switch 4330 can receive content from the video server(s) 4380 and communicate the content to the CPE 4314, 4322 via the access network 4366. The set-top box devices 4316, 4324 can receive the content via the CPE 4314, 4322, and can transmit the content to the television monitors 4318, 4326. In an illustrative embodiment, video or audio portions of the content can be streamed to the set-top box devices 4316, 4324.

Further, the AQT switch 4352 can be coupled to a video-on-demand importer server 4358 that receives and stores television or movie content received at the acquisition tier 4306 and communicates the stored content to the VOD server 4336 at the client-facing tier 4302 via the private network 4310. Additionally, at the acquisition tier 4306, the video-on-demand (VOD) importer server 4358 can receive content from one or more VOD sources outside the IPTV system 4300, such as movie studios and programmers of non-live content. The VOD importer server 4358 can transmit the VOD content to the AQT switch 4352, and the AQT switch 4352, in turn, can communicate the material to the CFT switch 4330 via the private network 4310. The VOD content can be stored at one or more servers, such as the VOD server 4336.

When users issue requests for VOD content via the set-top box devices 4316, 4324, the requests can be transmitted over the access network 4366 to the VOD server 4336, via the CFT switch 4330. Upon receiving such requests, the VOD server 4336 can retrieve the requested VOD content and transmit the content to the set-top box devices 4316, 4324 across the access network 4366, via the CFT switch 4330. The set-top box devices 4316, 4324 can transmit the VOD content to the television monitors 4318, 4326. In an illustrative embodiment, video or audio portions of VOD content can be streamed to the set-top box devices 4316, 4324.

FIG. 43 further illustrates that the operations and management tier 4308 can include an operations and management tier (OMT) switch 4360 that conducts communication between the operations and management tier 4308 and the public network 4312. In the embodiment illustrated by FIG. 43, the OMT switch 4360 is coupled to a TV2 server 4362. Additionally, the OMT switch 4360 can be coupled to an OSS/BSS server 4364 and to a simple network management protocol (SNMP) monitor 4386 that monitors network devices within or coupled to the IPTV system 4300. In a particular embodiment, the OMT switch 4360 can communicate with the AQT switch 4352 via the public network 4312.

In an illustrative embodiment, the live acquisition server 4354 can transmit content to the AQT switch 4352, and the AQT switch 4352, in turn, can transmit the content to the OMT switch 4360 via the public network 4312. In this embodiment, the OMT switch 4360 can transmit the content to the TV2 server 4362 for display to users accessing the user interface at the TV2 server 4362. For example, a user can access the TV2 server 4362 using a personal computer (PC) 4368 coupled to the public network 4312.

Figure 44:
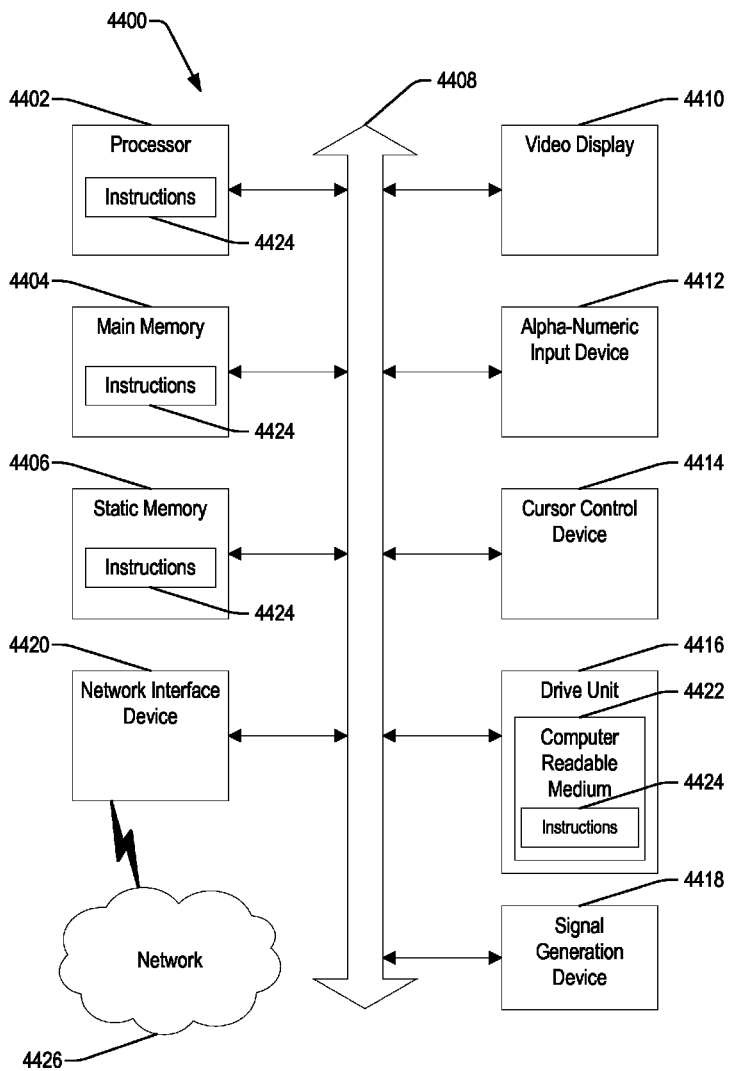
FIG. 44 is a block diagram of an illustrative embodiment of a general computer system.

Referring to FIG. 44, an illustrative embodiment of a general computer system is shown and is designated 4400. The computer system 4400 may include a set of instructions that can be executed to cause the computer system 4400 to perform any one or more of the methods or computer based functions disclosed herein. The computer system 4400 may operate as a standalone device or may be connected, e.g., using a network, to other computer systems or peripheral devices. For example, the computer system 4400 may include or be included within any one or more of the SHO 102, the VHOs 104-110, the RG 114, the STB devices, the phone 120, the PC 122, the input device 126, and the computer system 128 described with reference to FIG. 1.

In a networked deployment, the computer system 4400 may operate in the capacity of a server or as a client user computer in a server-client user network environment, or as a peer computer system in a peer-to-peer (or distributed) network environment. The computer system 4400 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a web appliance, or any other machine capable of executing a set of instructions (sequential or otherwise) that specify actions to be taken by that machine. In a particular embodiment, the computer system 4400 may be implemented using electronic devices that provide video, audio, or data communication. Further, while a single computer system 4400 is illustrated, the term "system" shall also be taken to include any collection of systems or sub-systems that individually or jointly execute a set, or multiple sets, of instructions to perform one or more computer functions.

As illustrated in FIG. 44, the computer system 4400 may include a processor 4402, e.g., a central processing unit (CPU), a graphics processing unit (GPU), or both. Moreover, the computer system 4400 may include a main memory 4404 and a static memory 4406, which can communicate with each other via a bus 4408. As shown, the computer system 4400 may further include a video display unit 4410, such as a liquid crystal display (LCD), a projection television system, a flat panel display, or a solid state display. Additionally, the computer system 4400 may include an input device 4412, such as a keyboard, and a cursor control device 4414, such as a mouse. The computer system 4400 may also include a disk drive unit 4416, a signal generation device 4418, such as a speaker or remote control, and a network interface device 4420. Some computer systems 4400 may not include an input device (e.g., a server may not include an input device).

In a particular embodiment, as depicted in FIG. 44, the disk drive unit 4416 may include a computer-readable non-transitory storage medium 4422 in which one or more sets of instructions 4424, e.g. software, can be embedded. Further, the instructions 4424 may embody one or more of the methods or logic as described herein. In a particular embodiment, the instructions 4424 may reside completely, or at least partially, within the main memory 4404, the static memory 4406, and/or within the processor 4402 during execution by the computer system 4400. The main memory 4404 and the processor 4402 also may include computer-readable non-transitory storage media.

In an alternative embodiment, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by the computer system 4400. Further, in an exemplary, non-limited embodiment, implementations may include distributed processing, component/object distributed processing, and parallel processing. Alternatively, virtual computer system processing may be constructed to implement one or more of the methods or functionality as described herein.

The present disclosure contemplates a computer-readable non-transitory storage medium that stores instructions 4424 or receives, stores and executes instructions 4424 responsive to a propagated signal, so that a device connected to a network 4426 may communicate voice, video or data over the network 4426. Further, the instructions 4424 may be transmitted or received over the network 4426 via the network interface device 4420.

While the computer-readable non-transitory storage medium is shown to be a single medium, the term "computer-readable non-transitory medium" includes a single medium or multiple media, such as a centralized or distributed database, and/or associated caches and servers that store one or more sets of instructions. The term "computer-readable non-transitory medium" shall also include any medium that is capable of storing instructions for execution by a processor or that cause a computer system to perform any one or more of the methods or operations disclosed herein.

In a particular non-limiting, exemplary embodiment, the computer-readable non-transitory storage medium may include a solid-state memory such as a memory card or other package that houses one or more non-volatile read-only memories. Further, the computer-readable non-transitory storage medium may be a random access memory or other volatile re-writable memory. Additionally, the computer-readable non-transitory storage medium may include a magneto-optical or optical medium, such as a disk or tapes or other storage device. Accordingly, the disclosure is considered to include any one or more of a computer-readable non-transitory storage medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP, IEEE 802.x) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A computer-implemented method, comprising:
   receiving, at a computing device, a request for user activity information associated with a television access network that provides multimedia content to users;
   generating, at the computing device, the user activity information based on execution of a model of a plurality of set-top boxes, wherein executing the model comprises, for a set-top box of the plurality of set-top boxes, determining to change a power state of the set-top box or change channels at the set-top box based on a rate moderating function, wherein the rate moderating function is based on an indication of periodic spikes in aggregate rates of changing the power state or the channels at a set of set-top boxes, and wherein determining to change the power state of the set-top box or change channels at the set-top box includes determining that the set-top box enters a sub-state of the set-top box based on a mixture exponential distribution, and determining a period of time that the set-top box is to remain in an on-state, an off-state, or tuned to a particular channel of the television access network while in the sub-state; and
   storing the user activity information.

2. The method of claim 1, further comprising using the user activity information to facilitate a design of the television access network.

3. The method of claim 1, further comprising using the user activity information to evaluate performance of the television access network.

4. The method of claim 1, wherein the rate moderating function is a periodic time-domain function derived from a frequency domain power function related to the indication of periodic spikes.

5. The method of claim 4, wherein the frequency domain power function is a probability density function of a Weibull distribution, wherein one or more function parameters of the probability density function include the indication of the periodic spikes, and wherein the periodic spikes occur every hour, every 30 minutes, every 15 minutes, or any combination thereof.

6. A system, comprising:
   a processor; and
   a memory, wherein the memory comprises instructions executable by the processor to perform operations including:
   generating estimated user activity information by executing a model of a plurality of set-top boxes, wherein executing the model comprises, for a set-top box of the plurality of set-top boxes, determining to change a power state of the set-top box or change channels at the set-top box based on a rate moderating function, wherein the rate moderating function is based on an indication of periodic spikes in aggregate rates of changing the power state or the channels at a set of set-top boxes, and wherein determining to change the power state of the set-top box or change channels at the set-top box includes determining that the set-top box enters a sub-state of the set-top box based on a mixture exponential distribution, and determining a period of time that the set-top box is to remain in an on-state, an off-state, or tuned to a particular channel of the television access network while in the sub-state; and
   modifying a parameter of a the multimedia content delivery system based on the estimated user activity information.

7. The system of claim 6, wherein the user activity information includes channel popularity dynamics, wherein executing the model further comprises selecting a channel of a plurality of channels based at least partially on a popularity of the channel, wherein the model is used to predict temporal patterns in channel popularity, and wherein the channel popularity dynamics are based on the temporal patterns in channel popularity.

8. The system of claim 7, wherein executing the model further comprises associating the set-top box with a class of a plurality of classes based on at least one grouping attribute, wherein the channel is selected based further on the class.

9. The system of claim 8, wherein the at least one grouping attribute comprises a threshold based grouping.

10. The system of claim 8, wherein the at least one grouping attribute comprises a clustering algorithm based grouping.

11. The system of claim 8, wherein the at least one grouping attribute includes television watching time.

12. The system of claim 11, wherein the plurality of classes includes a heavy television watchers class, a medium television watchers class, and a light television watchers class.

13. The system of claim 8, wherein the at least one grouping attribute includes channel changing frequency.

14. The system of claim 8, wherein the at least one grouping attribute includes dwell time per channel.

15. A computer-readable storage device storing instructions executable by a processor to cause the processor to perform operations including:

generating estimated unicast traffic data and estimated multicast traffic data by executing a model of a plurality of set-top boxes, wherein executing the model comprises, for a set-top box of the plurality of set-top boxes, determining to change a power state of the set-top box or change channels at the set-top box based on a rate moderating function, wherein the rate moderating function is based on an indication of periodic spikes in aggregate rates of changing the power state or the channels at a set of set-top boxes, and wherein determining to change the power state of the set-top box or change channels at the set-top box includes determining that the set-top box enters a sub-state of the set-top box based on a mixture exponential distribution, and determining a period of time that the set-top box is to remain in an on-state, an off-state, or tuned to a particular channel of the television access network while in the sub-state; and storing the estimated unicast traffic data and the estimated multicast traffic data to a storage medium, wherein the estimated unicast traffic data and the estimated multicast traffic data are used to determine a parameter for a network.

16. The computer-readable storage device of claim 15, wherein the estimated unicast traffic data and the estimated multicast traffic data are for a particular set-top box of the plurality of set-top boxes.

17. The computer-readable storage device of claim 15, wherein the at least one parameter is associated with a particular device of the network.

18. The computer-readable storage device of claim 17, wherein the at least one parameter is stored in a memory accessible to the particular device, and wherein the particular device accesses the at least one parameter and uses the at least one parameter during provision of multimedia content to users.

* * * * *